(12) United States Patent
Jia et al.

(10) Patent No.: US 12,255,943 B2
(45) Date of Patent: Mar. 18, 2025

(54) AUTOMATION OF REHEARSAL SESSIONS OF COMMUNICATION SESSIONS

(71) Applicant: MICROSOFT TECHNOLOGY LICENSING, LLC, Redmond, WA (US)

(72) Inventors: Yichen Jia, Kirkland, WA (US); Siunie Aquawati Sutjahjo, Seattle, WA (US)

(73) Assignee: Microsoft Licensing Technology, LLC, Redmond, WA (US)

( * ) Notice: Subject to any disclaimer, the term of this patent is extended or adjusted under 35 U.S.C. 154(b) by 0 days.

(21) Appl. No.: 18/090,474

(22) Filed: Dec. 28, 2022

(65) Prior Publication Data

US 2024/0223639 A1    Jul. 4, 2024

(51) Int. Cl.
*H04L 65/80*    (2022.01)
*H04L 12/18*    (2006.01)
*H04L 41/22*    (2022.01)
*H04L 65/1069*    (2022.01)

(52) U.S. Cl.
CPC .......... *H04L 65/80* (2013.01); *H04L 12/1818* (2013.01); *H04L 41/22* (2013.01); *H04L 65/1069* (2013.01)

(58) Field of Classification Search
CPC ..... H04L 65/80; H04L 12/1818; H04L 41/22; H04L 65/1069
See application file for complete search history.

(56) References Cited

U.S. PATENT DOCUMENTS

2009/0231438 A1    9/2009    Srivastava
2011/0270922 A1    11/2011   Jones et al.
2012/0287289 A1    11/2012   Steinberg et al.
2013/0305091 A1    11/2013   Stan
2018/0034581 A1    2/2018    Gupta
(Continued)

FOREIGN PATENT DOCUMENTS

WO    WO-2023049483 A1 *    3/2023

OTHER PUBLICATIONS

International Search Report and Written Opinion received for PCT Application No. PCT/US23/079950, Mar. 18, 2024, 13 pages.
(Continued)

*Primary Examiner* — Kristie D Shingles
(74) *Attorney, Agent, or Firm* — Scott Y. Shigeta; Newport IP, LLC

(57) ABSTRACT

The techniques disclosed herein provide a set of tools that help event organizers better prepare for important events by facilitating features of rehearsal sessions. In some configurations, a system can create a rehearsal session in the process of setting up a meeting. Thus, if a meeting organizer is setting up a company all-hands meeting, the tools provide options that allow event organizers to setup multiple rehearsal sessions effortlessly in the event scheduling flow. The tools enable a system to perform tests that simulate event attendees. This allows an organizer to test specific user activity involving each users' experience in joining a meeting or performing common attendee behaviors like a virtual hand raise or a reaction. The system also provides intelligent technical checks that automatically test each presenter's device settings and displays real-time telemetry data to effectively communicate any performance issues to a meeting organizer.

19 Claims, 32 Drawing Sheets

(56) References Cited

U.S. PATENT DOCUMENTS

| | | |
|---|---|---|
| 2019/0246146 A1 | 8/2019 | Bustamante et al. |
| 2020/0133257 A1 | 4/2020 | Cella |
| 2020/0186375 A1 | 6/2020 | Faulkner |
| 2020/0382618 A1 | 12/2020 | Faulkner et al. |
| 2021/0105147 A1* | 4/2021 | Waugh ................. H04L 67/535 |
| 2022/0103566 A1 | 3/2022 | Faulkner |
| 2023/0111900 A1* | 4/2023 | Kim ..................... H04L 67/306 |
| | | 709/231 |

OTHER PUBLICATIONS

International Search Report and Written Opinion received for PCT Application No. PCT/US2023/036981, Feb. 14, 2024, 12 pages.
U.S. Appl. No. 18/090,472, filed Dec. 28, 2022.
Notice of Allowance mailed on Sep. 4, 2024, in U.S. Appl. No. 18/090,472, 07 pages.
Non-Final Office Action mailed on Mar. 13, 2024, in U.S. Appl. No. 18/090,472, 12 pages.

* cited by examiner

REHEARSAL - LIVE  22:06  REHEARSAL: CEO CONNECT  — ☐ ✕
LEAVE

Event Assistant  — ☐ ✕

You had a Successful Simulation

Telemetry Report will be ready in 15 minutse

Summary
List of changes made during the Simulation

Device Settings

-Audio input: Bose Headset added
-Noise Suppression: set to High
- Mirror my video: set to On

SAVE DEVICE SETTINGS

Engagement Applications
You added the following apps:
-Poll

SAVE APPS

Organizer  Presenter  Presenter

Open Attendee View

FIG. 29

AUTOMATION OF REHEARSAL SESSIONS OF COMMUNICATION SESSIONS

BACKGROUND

There are a number of different types of collaborative systems that allow users to communicate. For example, some systems allow people to collaborate by sharing content using video and audio streams, shared files, chat messages, etc. Some systems provide user interface formats that allow users to share content with an audience. Such systems can provide specific sets of permissions that allow users to take specific roles, such as a presenter, audience member, etc.

Although some collaborative systems can provide a platform for a number of users to share live video streams and audio streams using specific sets of permissions for users to take on certain roles, such systems have a number of drawbacks. For instance, when a communication session involves a large number of people that are located in different parts of the world, there can be a large number of technical settings that are needed to optimize a meeting. These settings can include, but are not limited to, network settings, audio settings, video settings, user access user permissions, etc. The process of optimizing these technical settings can be a complex and cumbersome process.

In order to test the settings of a meeting, some existing systems require a meeting organizer to take the time to manually setup another meeting that has the same attendees. This can require a number of people to be available for testing network connections, audio settings, etc. For instance, if an upcoming meeting involved people in three countries, a meeting organizer would have to setup a meeting that includes people in each country to properly test the connection. If connectivity issues arise, that team has to go through a complex task flow to identify the issues and ultimately develop solutions that may be needed to address the identified issues. Existing systems do not provide telemetry data, and thus special tools and specialized skillsets may be needed to thoroughly test a system.

Even when solutions can be developed from a manually configured test meeting, meeting organizers are still required to take notes on how issues were identified and resolved, and manually apply any learned solutions to the original meeting. This manual process can lead to a number of errors given that extensive manual inputs are required, which can lead to inadvertent inputs and other issues. These errors can also lead to security issues if permissions are not configured correctly.

SUMMARY

The techniques disclosed herein provide a set of tools that help event organizers better prepare for important events by facilitating features of rehearsal sessions. In some configurations, a system can create a rehearsal session in the process of setting up a meeting. Thus, if a meeting organizer is setting up a company all-hands meeting, The tools provide options that allow event organizers to setup multiple rehearsal sessions effortlessly in the event scheduling flow. The tools enable a system to perform tests that simulate event attendees. This allows an organizer to test specific user activity involving each users' experience in joining a meeting or performing common attendee behaviors like a virtual hand raise or a reaction. The attendee simulations can also test other attendee experiences that involve the communication of messages, audio streams, and video streams. The system also provides intelligent technical checks that automatically test each presenter's device settings. The system also generates real-time telemetry data to effectively communicate any performance issues to a meeting organizer. This enables the system and meeting organizers to make sure each device that is configured correctly. The system also provides automatic warnings and actionable suggestions if issues are detected.

The system disclosed herein can also generate summary data to effectively record all of the changes to the system configuration settings that are determined during the rehearsal session. This allows meeting organizers to store the changes to the system configuration settings and easily re-apply them for the actual event. The system disclosed herein also provides real-time telemetry data using visualizations that are positioned in displays with predefined metrics and thresholds that make it easy for an organizer to identify issues. When telemetry data indicates one or more issues, the system can also generate suggestions on steps that end-users can make to solve those problems. These suggestions can be based on an artificial intelligence (AI) model that is from past observations. The settings can also be automatically integrated back into the settings of the original meeting.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 11 shows a user interface displayed during a rehearsal meeting, where telemetry data for presenters can be accessed.

FIG. 13 shows a user interface displayed during a rehearsal meeting, where telemetry data for presenters is displayed and buttons are displayed for accessing solutions.

FIG. 14 shows a user interface displayed during a rehearsal meeting, where solutions are displayed.

FIG. 15 shows a user interface displayed during a rehearsal meeting, where telemetry data for presenters is displayed and buttons are displayed for accessing meeting details.

FIG. 17 shows a user interface displayed during a rehearsal meeting, where telemetry data for a rehearsal staging room phase is displayed.

FIG. 18 shows a user interface displayed during a rehearsal meeting, where buttons are displayed for starting a live rehearsal.

FIG. 28 shows a user interface displayed after a live rehearsal, where the display includes a summary of the rehearsal.

FIG. 29 shows a user interface displayed after a live rehearsal, where the display includes a report of the rehearsal.

DETAILED DESCRIPTION

The techniques disclosed herein provide a set of tools that help event organizers better prepare for important events by facilitating features of rehearsal sessions. If a meeting organizer wants to prepare for a meeting, which can include large meetings, a system provides feature that helps the organizer and presenters of the meeting to do a rehearsal or a dry run. The system introduces feature that automate a number of technical checks and measurements to help the organizer and presenters identify issues during rehearsal sessions. The tests can include, but is not limited to, tests of audio signals, video signals, network settings, etc. The tests can also provide previews of user interface layouts from the perspective of audience members. The system can then generate specific settings or suggestions for particular settings based on the technical checks and the measurements. The system can also manage the generated settings and suggestions for other settings so that meeting organizers and presenters can use those generated settings and suggestions as a reference. The syst can also automatically integrate the generated settings and suggestions from the rehearsal session into one or more meetings.

The rehearsal sessions can be generated from data objects defining an original meeting or the rehearsal sessions can be generated from a process flow used to configure an original meeting. The tools for establishing and managing the rehearsal sessions enable organizers and presenters of the meeting to conduct a "dry run" of the meeting. A rehearsal session can include a subset of people that are invited to an original meeting. The subset of people can be based on the roles of each invitee. For instance, if an original meeting includes an organizer, presenters, and audience members, the system can generate a rehearsal session that only includes the organizer and presenters. The system can also provide hardware and software that simulates the audience members so the organizer and presenters can get a preview of that the audience will see and hear in a meeting. As describe the more detail below, the rehearsal session can conduct a number of tests with a subset of people by the use of different tested measurement tools, which eliminates the need for a broad audience and their respective devices to be involved in the testing session.

Figure 1:
FIG. 1 shows a user interface configured for establishing settings of an original meeting.

With reference to FIGS. 1-5, aspects of a process flow for establishing a rehearsal session are shown and described. In this example a rehearsal session is generated from a process flow for configuring an original meeting. When an organizer schedules the original meeting, the system prompts the organizer, e.g., a first User 10A, to see if the organizer wants to schedule the rehearsal session as well. FIG. 1 shows a first user interface 101A that is configured for display to the organizer, e.g., User 10A. This first user interface 101A allows the organizer to list a number of individuals that will be invited to the meeting. The user interface also allows the organizer to assign roles to each of the invitees. For instance, Bryan is assigned a co-organizer role; Charlotte, Krystal and Ray are assigned a Presenter role, and other people under a company alias are assigned with an Audience role. The user interface is also configured to receive a date and time of the original meeting. The user interface is also configured to receive a set of options, which the organizer can view by selecting the "Options" menu.

Figure 2:
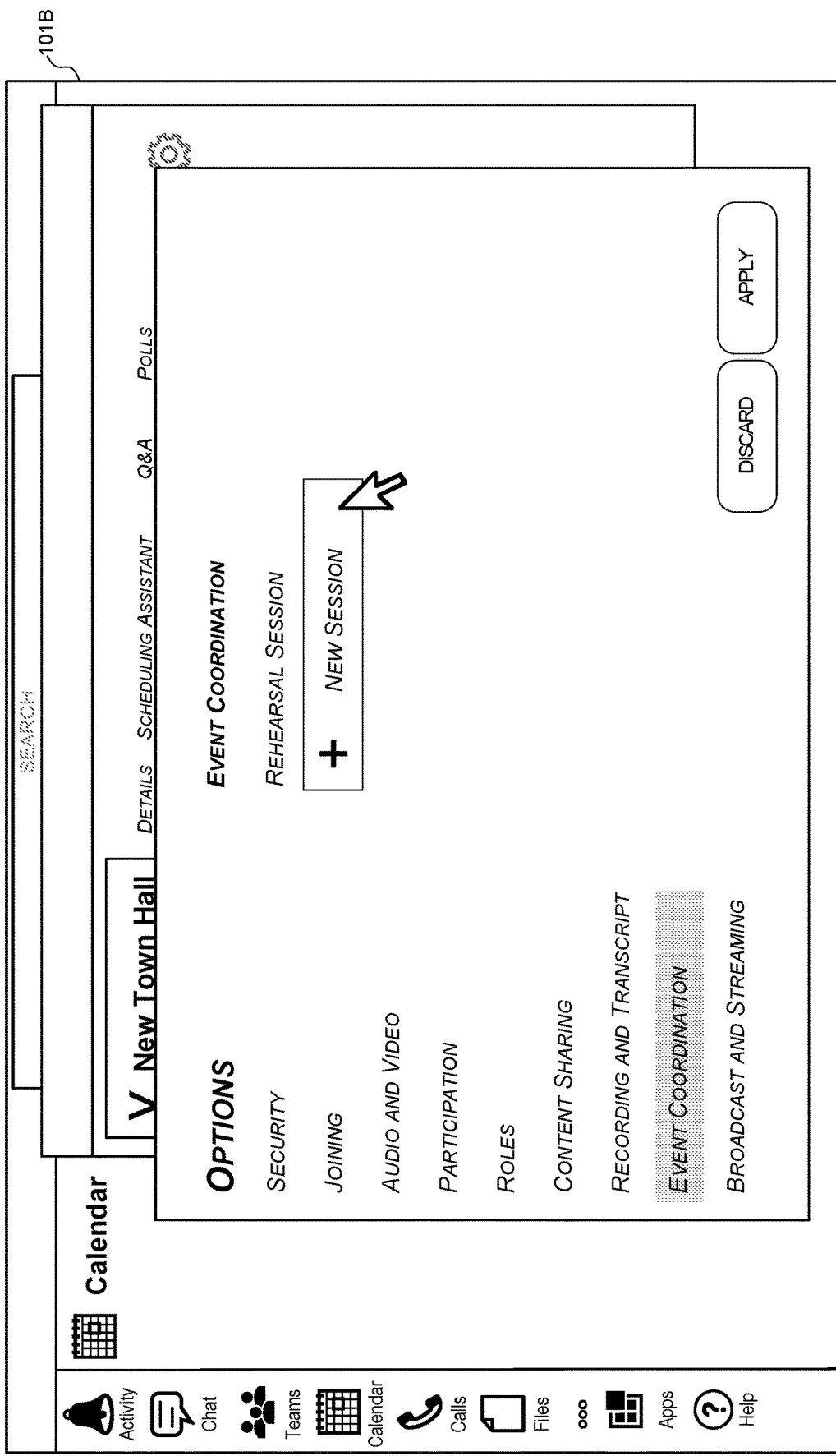
FIG. 2 shows a user interface configured for establishing settings of a rehearsal meeting, e.g., a rehearsal session or a test session.
Figure 3:
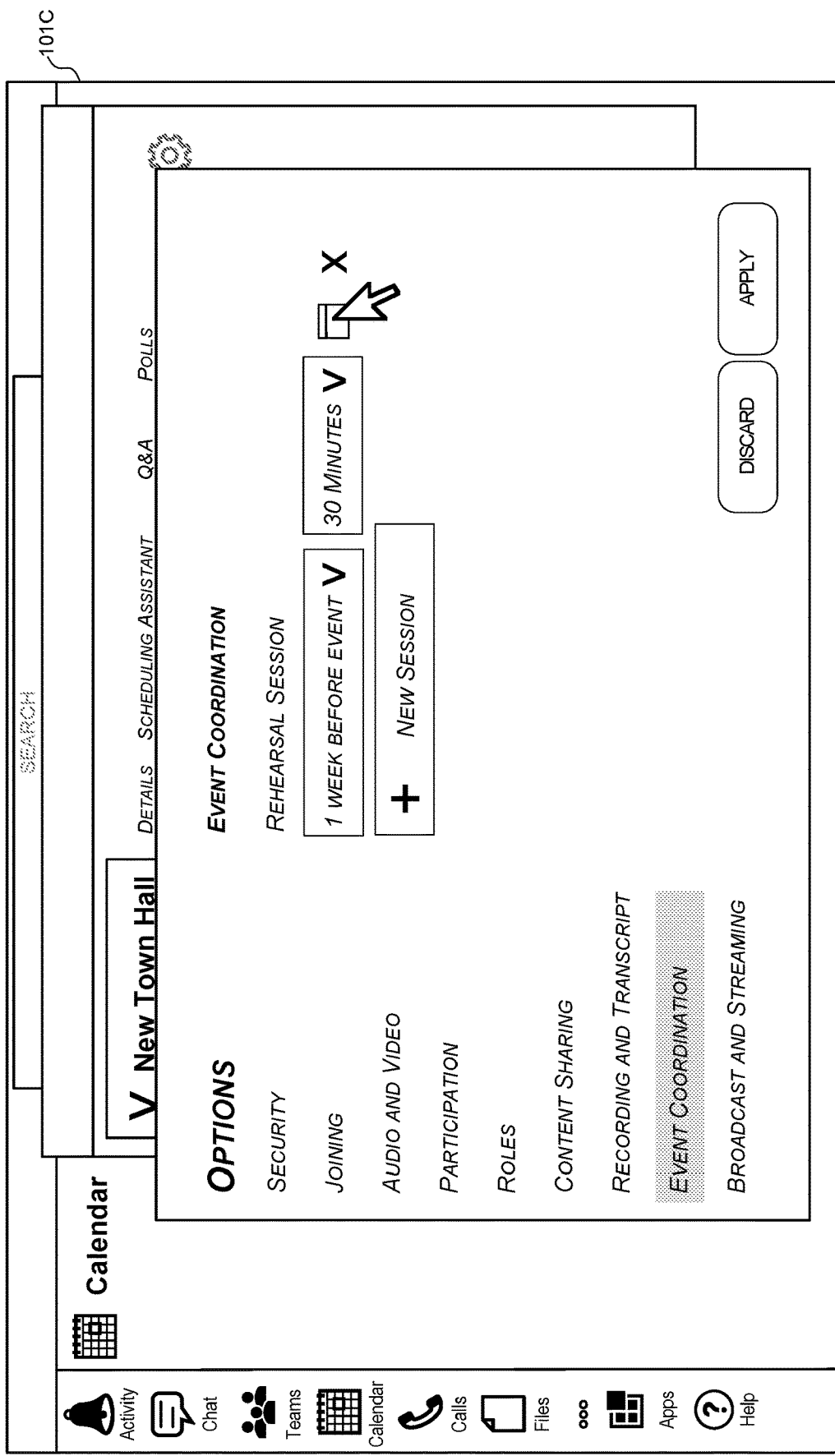
FIG. 3 shows a user interface configured for establishing a time of a rehearsal meeting.
Figure 4:
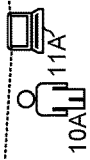
FIG. 4 shows a user interface configured for adding additional rehearsal meetings.

FIG. 2 shows a second user interface 101B that is configured to display different menu items to allow the organizer to configure meeting options. In this example, the second user interface 101B allows the organized to select a menu item for "event coordination." The menu allows the organizer to establish a new rehearsal session. In response to the selection of the new rehearsal session button, as shown in the UI format 101C of FIG. 3, the system can provide a number of options for a time and date of the rehearsal session. Some default dates can be automatically displayed that will cause the rehearsal session to start prior to the original meeting date. The system can enable a user to set up more than one rehearsal session. The user can select the menu for adding as many rehearsal sessions as needed. As shown in the UI format 101D of FIG. 4, the system can allow the user to set a time for each of the rehearsal sessions. Once those times and dates are selected for the rehearsal session, e.g., by selecting the "Apply" button, the system can generate a rehearsal data object storing aspects of the rehearsal session.

The rehearsal session can include a subset of users that were included in the original meeting. In some configurations, people having predetermined roles can be automatically included in the rehearsal session. For example, the system can import the identifiers of organizers and presenters into the rehearsal session from the data defining the original meeting. The system can also grant the organizers and presenters with administrative permissions to allow the organizers and presenters to execute tests during the rehearsal session. In addition, system can also grant the organizers and presenters with administrative permissions to write or approve meeting settings for the rehearsal session and for the original meeting. This includes meeting settings that control tests that may be executed, the invocation of bots in designated locations, and control permissions for other invitees. These are permissions that were not granted to the organizers and presenters prior to the generation of the rehearsal session. These administrative permissions can also be configured to be automatically revoked either after the rehearsal session or after the original meeting.

The system can also copy other options to the rehearsal session from a data object defining the original meeting. For example, if audience members have permissions for receiving audio and video streams and have permission to chat, those meeting options will be copied to the rehearsal session from a data object defining the original meeting. For the rehearsal session, permissions for audience members may be applied to bots for testing network configurations.

Other options e.g., permissions and settings, such as audio settings and video settings, can also be copied to the rehearsal session from a data object defining the original meeting. If the organizer has established certain options or permissions for certain roles in the original meeting, those permissions are copied to the rehearsal session. For example, if the organizer sets a mute for all audience members but has exceptions for three specific members, such permissions can be copied from the original meeting settings to a data object defining the rehearsal session.

Other meeting options, such as managed mode options, for controlling visualizations can also be copied from the original meeting settings to a data object defining the rehearsal session. For example, if an organizer set options that only allow audience member to see specific views of video streams or views of certain content, those options can also be copied from the original meeting settings to a data object defining the rehearsal session. Other options for other functionality can also be copied from the original meeting settings to a data object defining the rehearsal session. This can include data objects or plug-ins for Question and Answer (Q&A) Sessions, Polls, etc. If such functionality is included in the original meeting, this functionality is replicated in, or linked to, the rehearsal session based on the data defining the original meeting.

This automated replication of parameters from the original meeting to the rehearsal session also includes the replication of shared files. For instance, if a presenter has a particular slide deck having a particular format, that slide deck is copied from the original meeting to the data object defining the rehearsal session. This allows the rehearsal session to test the actual file that is to be shared in the original meeting. This allows the system to identify issues with a file particularly if it presents formatting issues or it has other problems, e.g., corrupted or incompatible data. This automated replication of parameters and files from the original meeting to the rehearsal session eliminates the need for users to have to manually set up a new meeting to test the parameters of the original meeting.

Figure 5:
FIG. 5 shows a user interface having a meeting displayed to a coordinator of a rehearsal meeting.

Once the parameters of the rehearsal session are generated, rehearsal objects are communicated to the attendees of the rehearsal session. In this example, the rehearsal session is communicated to the calendars of the designated invitees of the rehearsal session which, in this example, are the organizers and the presenters. FIG. 5 shows an example of a rehearsal session that is populated on the calendar of a second user, e.g., a co-organizer, Bryan Wright.

FIGS. 6-18 show examples of the various tests and measurements that can be conducted during a test phase referred to herein as a "rehearsal staging room" of a rehearsal session. Shown in these examples, visualizations of presentations, user interface formats, audio signals, video signals and other parameters can be tested for a subset of the users, such as the organizers and presenters. This allows the presenters and the organizers to test all parameters to ensure that all of the settings work properly prior to a live rehearsal.

Figure 6:
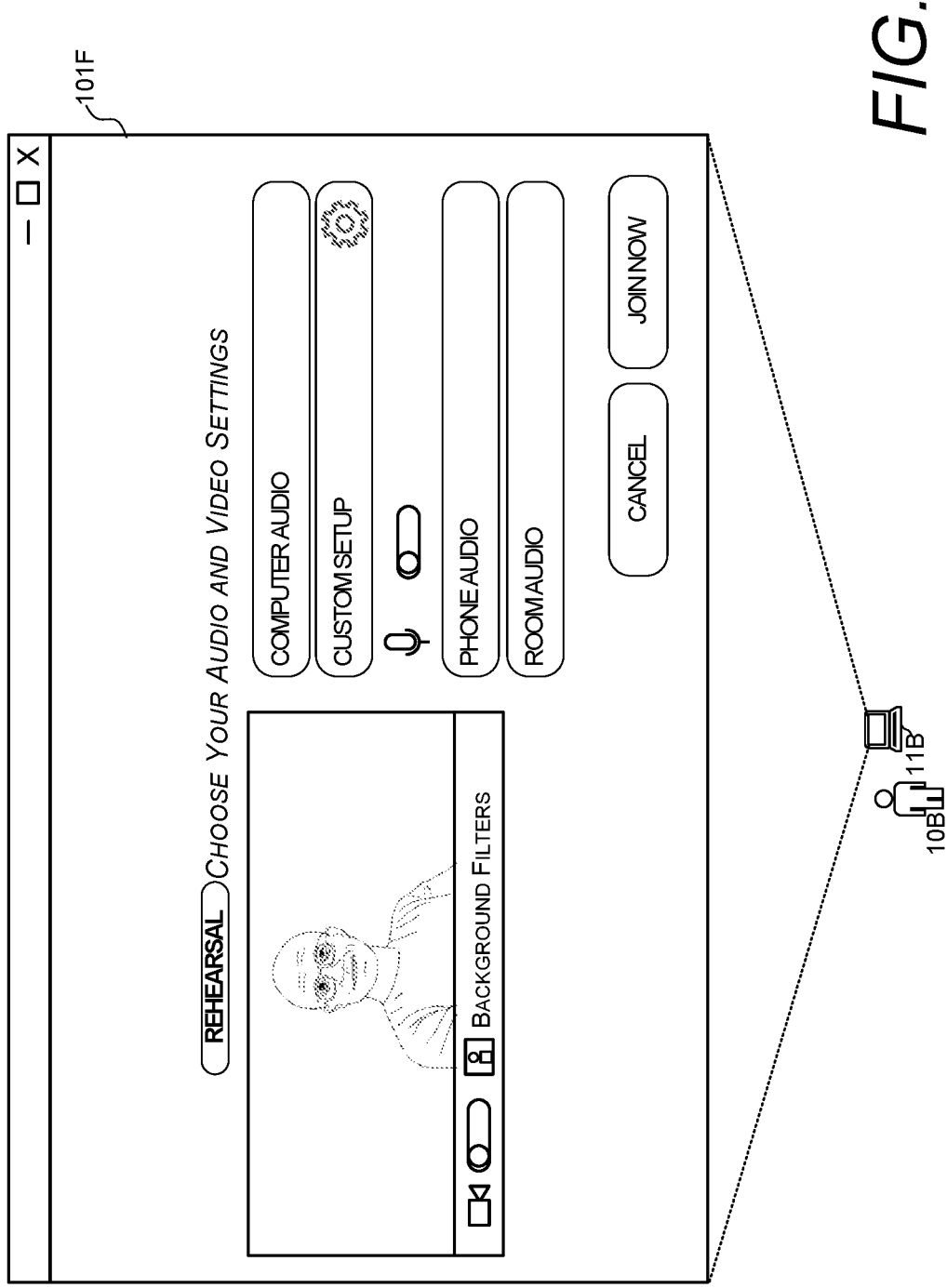
FIG. 6 shows a user interface having text indicators showing a meeting is a rehearsal meeting.

FIG. 6 shows an example of a pre-join screen. In this example, the user interface 101F is shown to the second user 10B, the co-organizer, Bryan Wright. In the pre-join screen, organizer and see the rehearsal label, so they understand this meeting is not visible nor impacting any attendees. This allows the user to select the "join now" button to start the "rehearsal staging room." In this example, when an organizers is referred to herein as joining a meeting, that means the system is running phase referred to herein as a "rehearsal staging room" of a rehearsal session.

Figure 7:
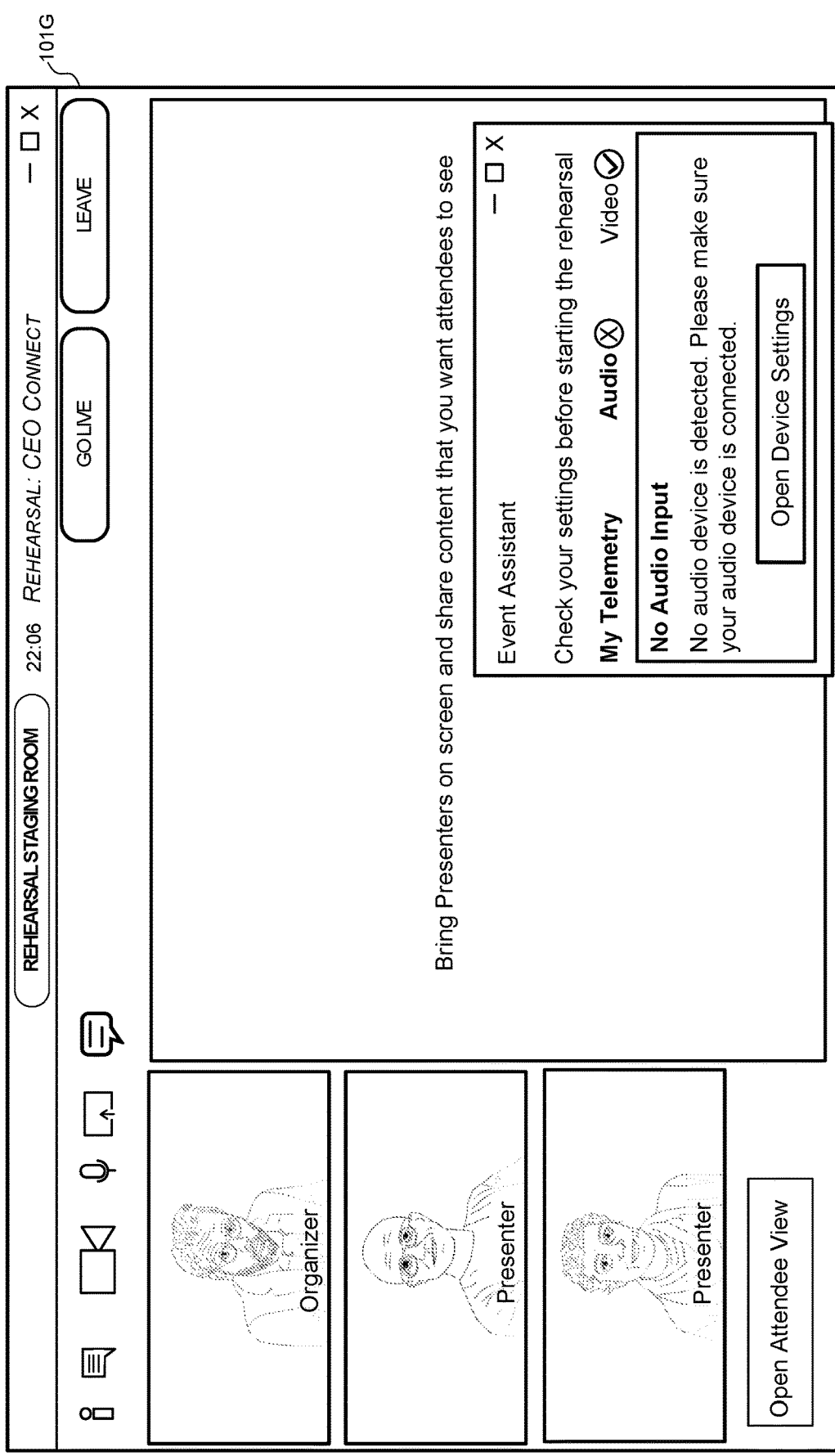
FIG. 7 shows a user interface displayed during a rehearsal meeting, where a tech check is performed for an organizer.

Once organizer enters the meeting, as shown in FIG. 7, a tech check will be done automatically. A tech check includes communication tests for the video data and audio data of the organizer. The organizer will see alerts if there's anything wrong with their audio and video, and the Call to action to fix those problems. For example, this UI shows that the organizer's audio has no input but the video has no present issues. This can be done by running a test to see if a hardware device is connected. If a hardware device, such as a headphone with a microphone, is not connected, then the system can generate a warning indicating the same. This warning can be provided with guidance on how to solve the detected issue. This allows the user to solve the issue by making sure and audio device is connected, and check device setting.

Figure 8:
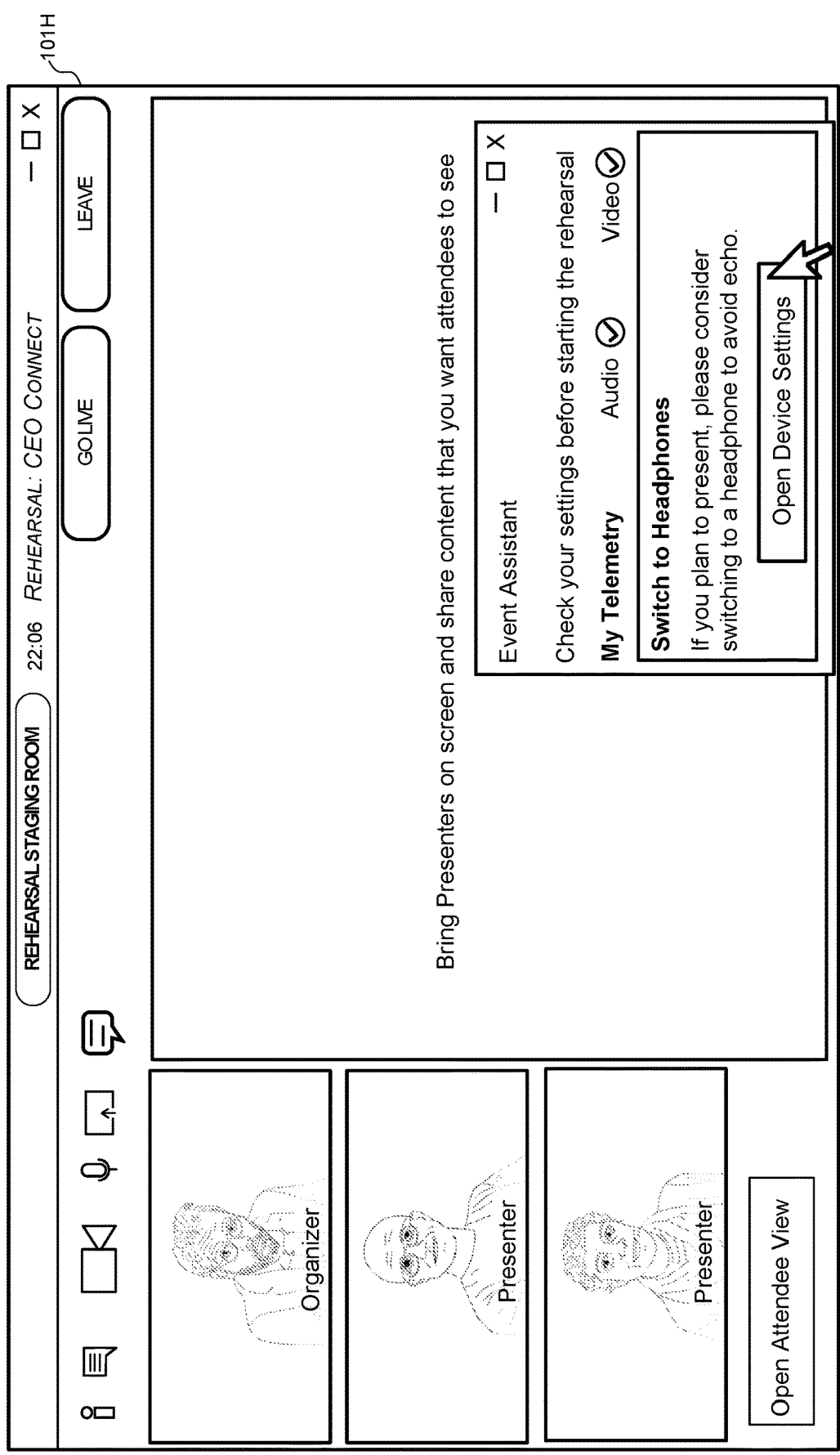
FIG. 8 shows a user interface displayed during a rehearsal meeting, where settings for an organizer can be accessed.

FIG. 8 shows another example of a detected issue. In this example, even though organizer's audio and video all have good quality, the system detects that the audio is coming from a monitor instead of headphone. In the detection of such a setup, the system suggests to the organizer to switch devices to achieve the best result. This is usually something a meeting producer will tell each presenter and organizer during a manual tech check, but this system provides this feature automatically to save time for all users. Hardware optimization can be achieved by having a database of different types of ranked devices such as headphones and different types of speakers. These devices can be ranked and when one device is detected as connected the system can pick the next, e.g., higher ranking, device on the list to make a recommendation on optimization. As shown, the user can select the "Open Device Settings" user interface element to adjust the device settings.

Figure 9:
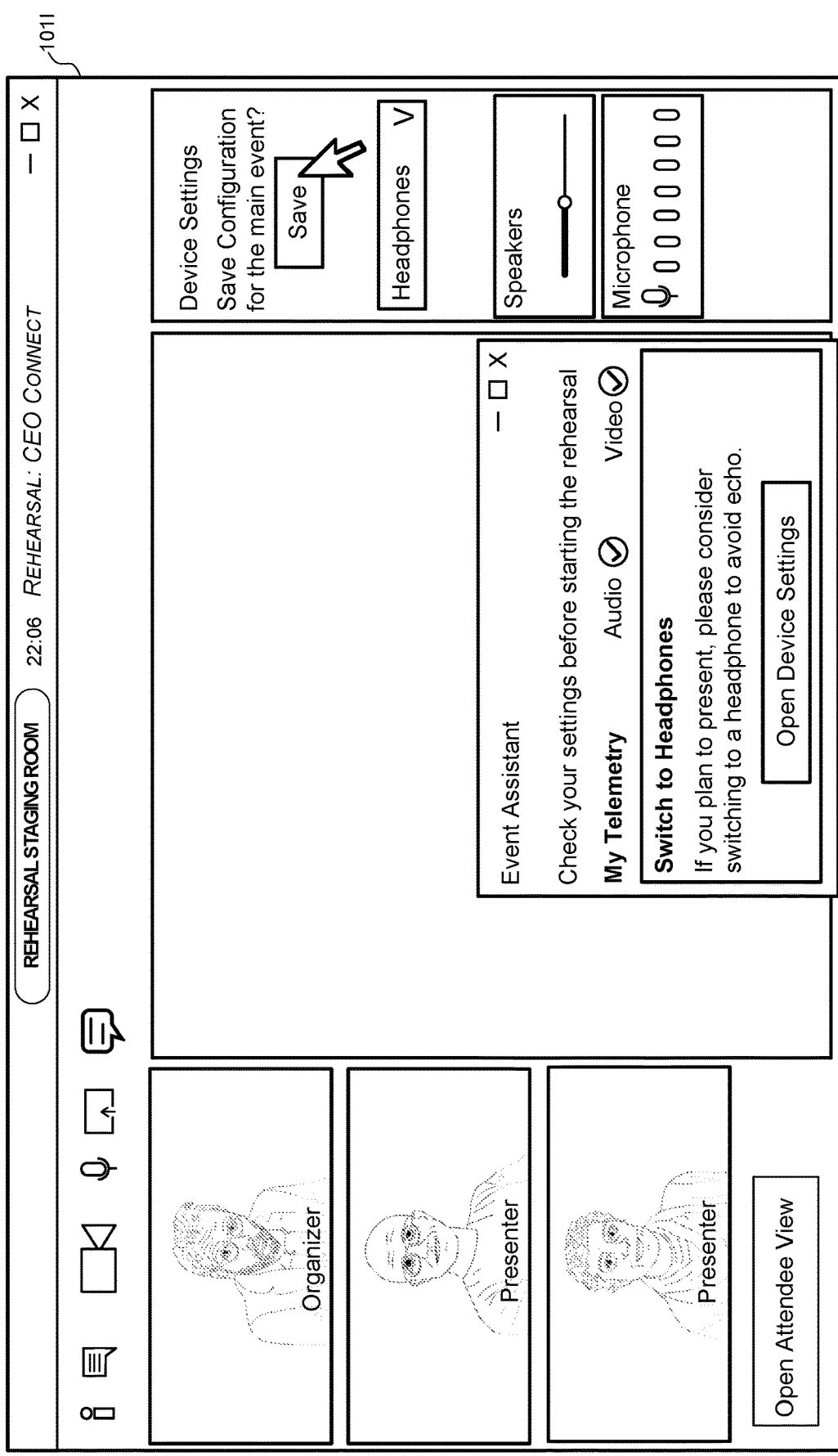
FIG. 9 shows a user interface displayed during a rehearsal meeting, where settings for an organizer are displayed.

FIG. 9 shows a device settings user interface. The device settings can be shown in a side rail providing options for the user to select a new hardware device, such as headphones. The user can also adjust volume levels for each device. Other features can include the activation of noise suppression features and adjustment of video camera parameters. As shown, the user interface can also show real-time telemetry that adjusts in response to the setting changes. Thus, when a person plugs in a headphone, and the headphone meets one or more criteria or thresholds, the system displays a check box in the audio indicator. As shown, the user can save these changes and close the device settings window.

Figure 10:
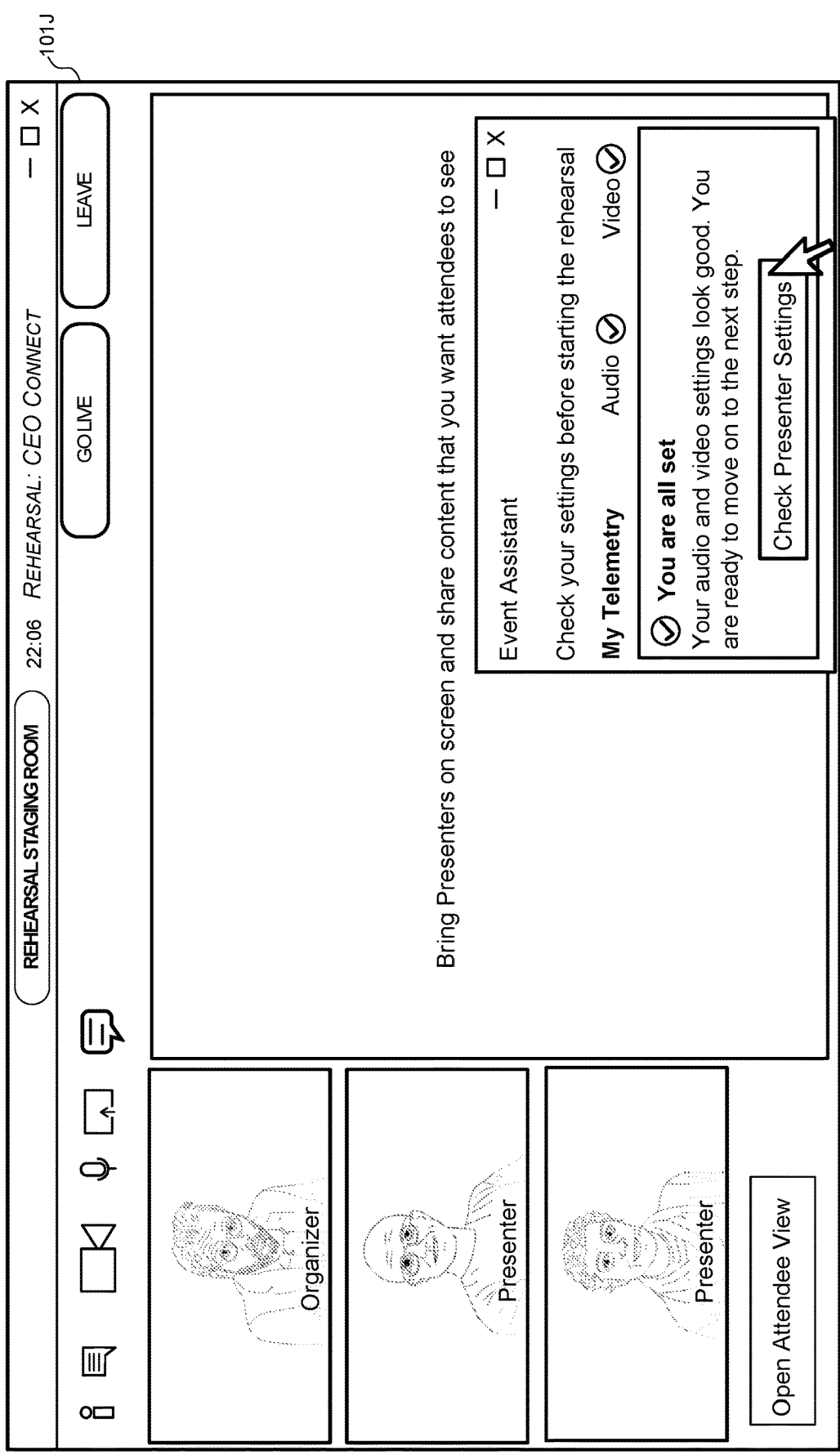
FIG. 10 shows a user interface displayed during a rehearsal meeting, where an organizer can move to a phase for testing presenter settings and hardware.

FIG. 10 shows a user interface after the device settings window is closed. Once the alerts are taken care of for the organizer, the system can provide features for checking the each presenter's audio and video. This menu can provide a user interface element, e.g., a button, for allowing the organizer to move the testing phase to the presenters.

Figure 11:
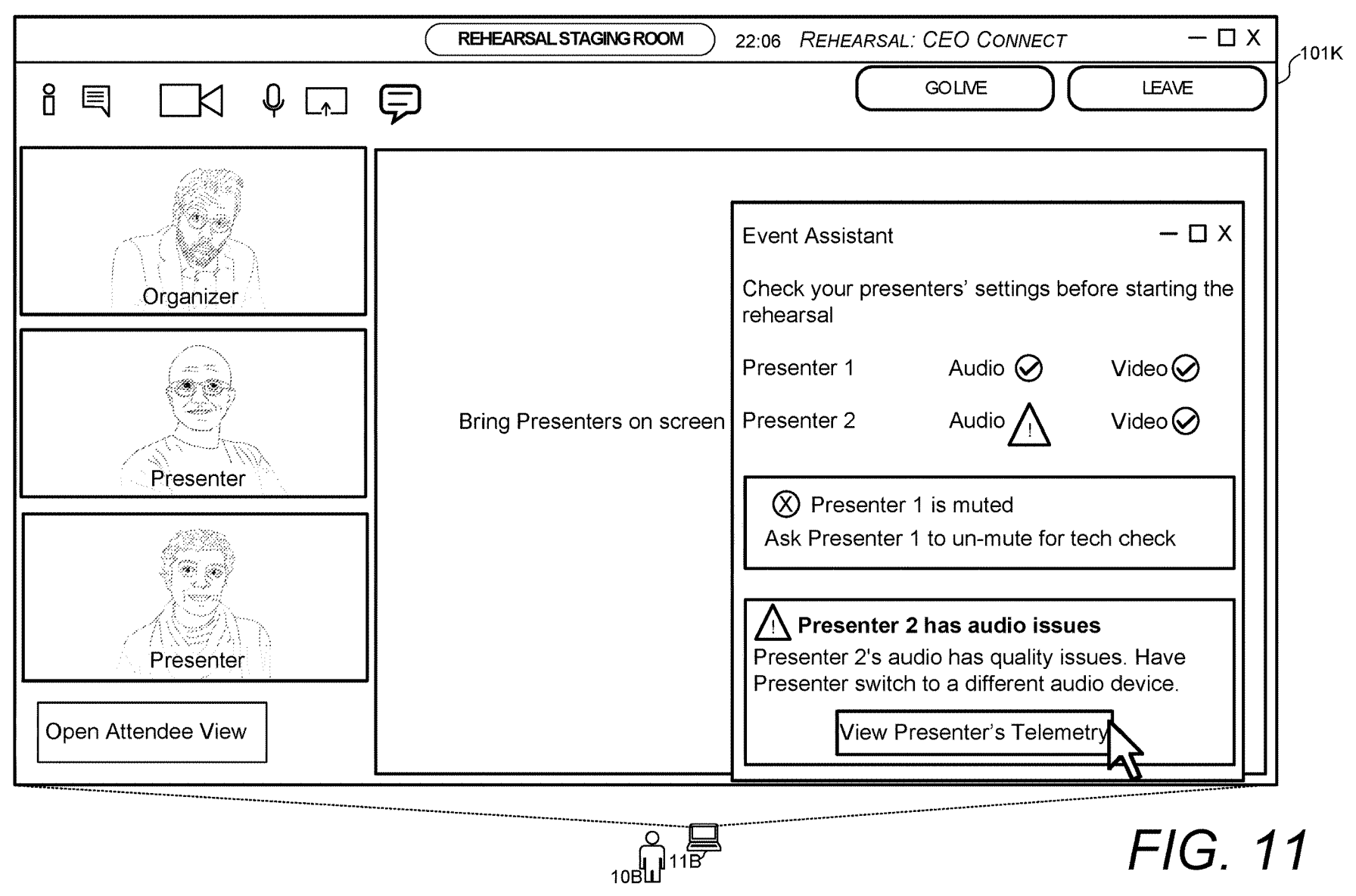

FIG. 11 shows a user interface during a testing phase for the presenters. In this phase of testing, the system displays an overview of each presenter's telemetry data, errors and warnings. The system runs tech checks for each of presenters' audio and video signals. When issues are detected, such as a missing hardware device, the system displays an indication of those issues. When the system tech check determines that audio signals and video signals are meeting a threshold, the system provides a positive indication such as a check mark. The user interface also provides an element for activating a telemetry view, e.g., a telemetry button.

Figure 12:
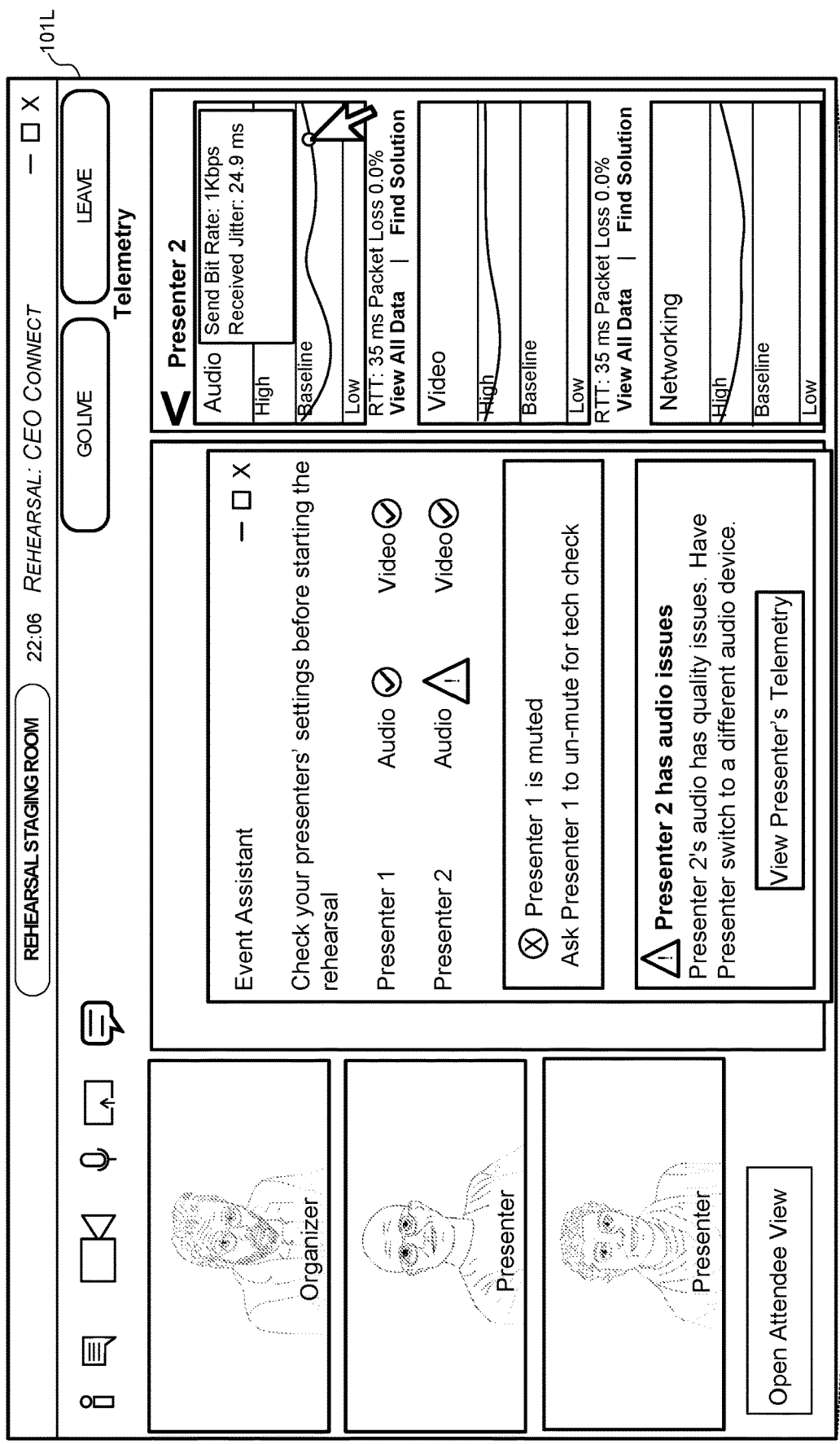
FIG. 12 shows a user interface displayed during a rehearsal meeting, where telemetry data for presenters is displayed.
Figure 13:
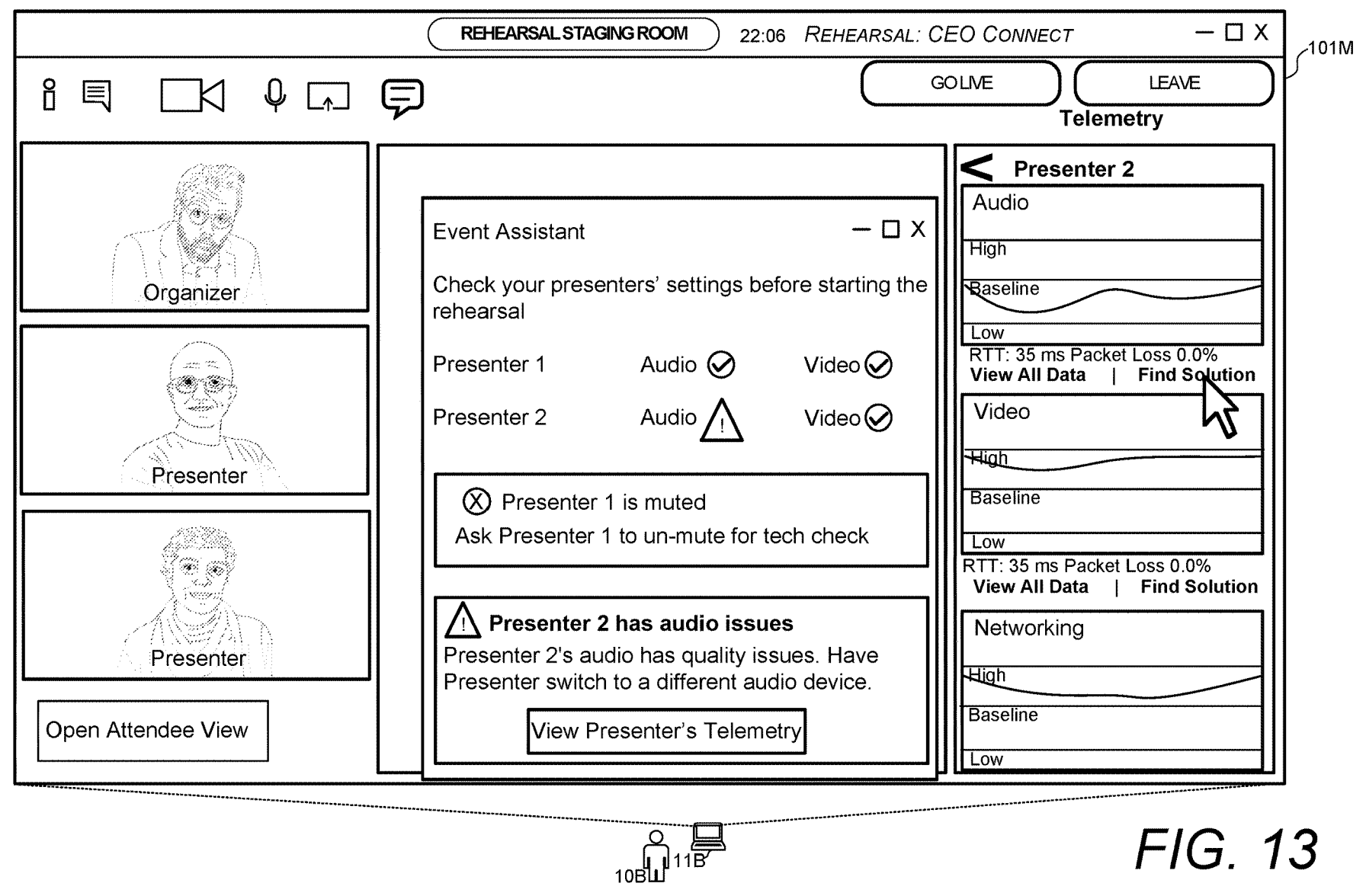

FIG. 12 shows the user interface showing a presenter's telemetry data. This shows all of the raw data from the audio and video checks, and their history. A user can also hover over a chart and cause the system to show specific data, e.g., a detected jitter and bit rate. By providing the organizer with the raw telemetry view in chart form, the system provides access to the presenter's telemetry data and enables them to identify specific times in which an issue occurred. In addition, the system shows the audio and video quality, which can be exported. This enables a more detailed analysis from an IT admin or support team. As shown in FIG. 13, the user interface can also provide user interface elements for allowing a user to find a solution for each detected problem. In this example, the second presenter has issues with their audio, which is below a baseline, and the organizer selects the solutions link.

Figure 14:
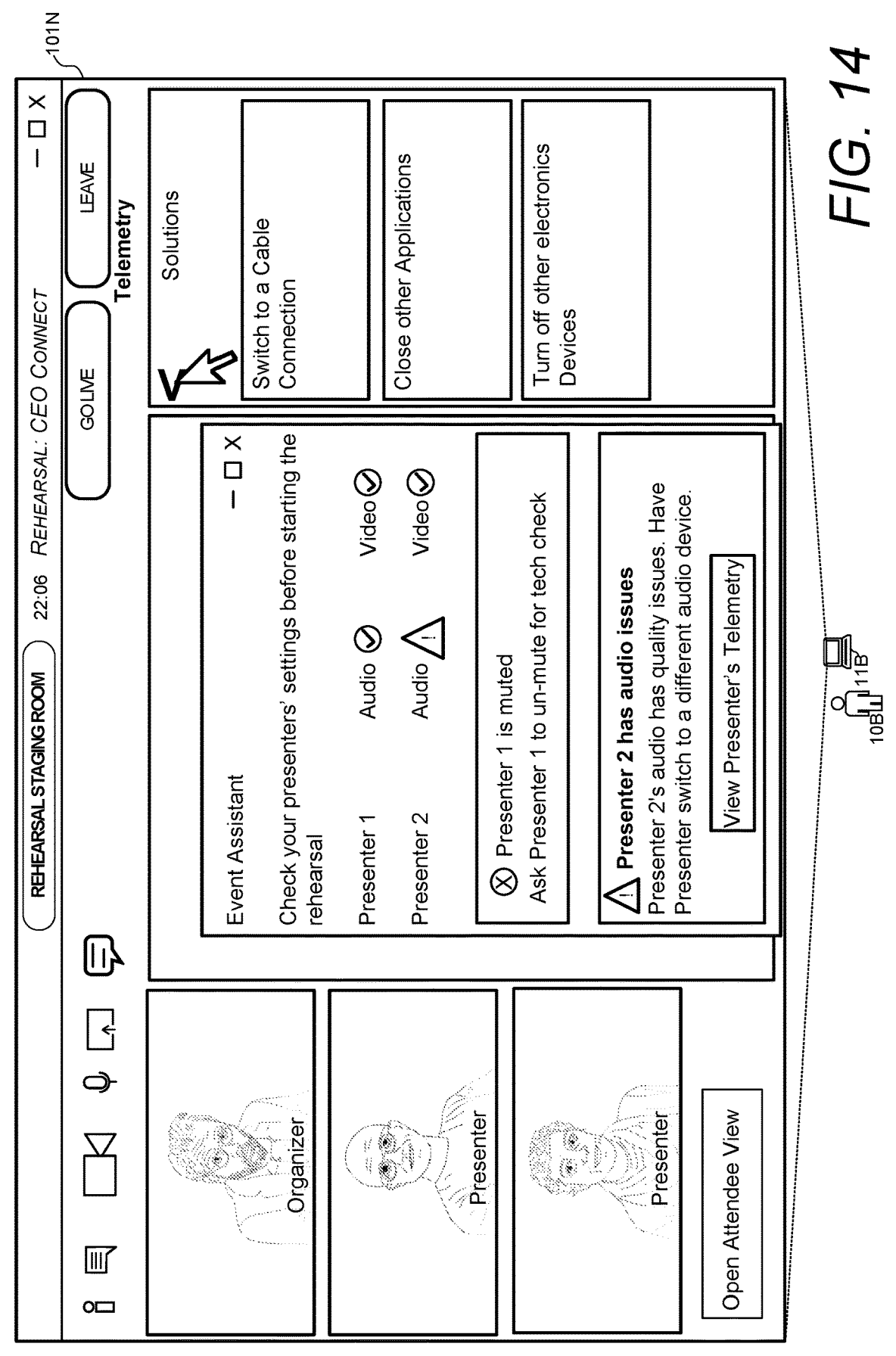

FIG. 14 shows an array of solutions that the system can provide based on the detected issues. The system can make a number of recommendations. For example, the system can recommend reconnecting hardware such as cables and hardware. The system can recommend closing other applications if the system detects that other applications are open. The system can also suggest that users turn off other electronic devices that might be interfering with a connection. Once the solutions are displayed, the user can select the back button and return to the telemetry data.

Figure 15:
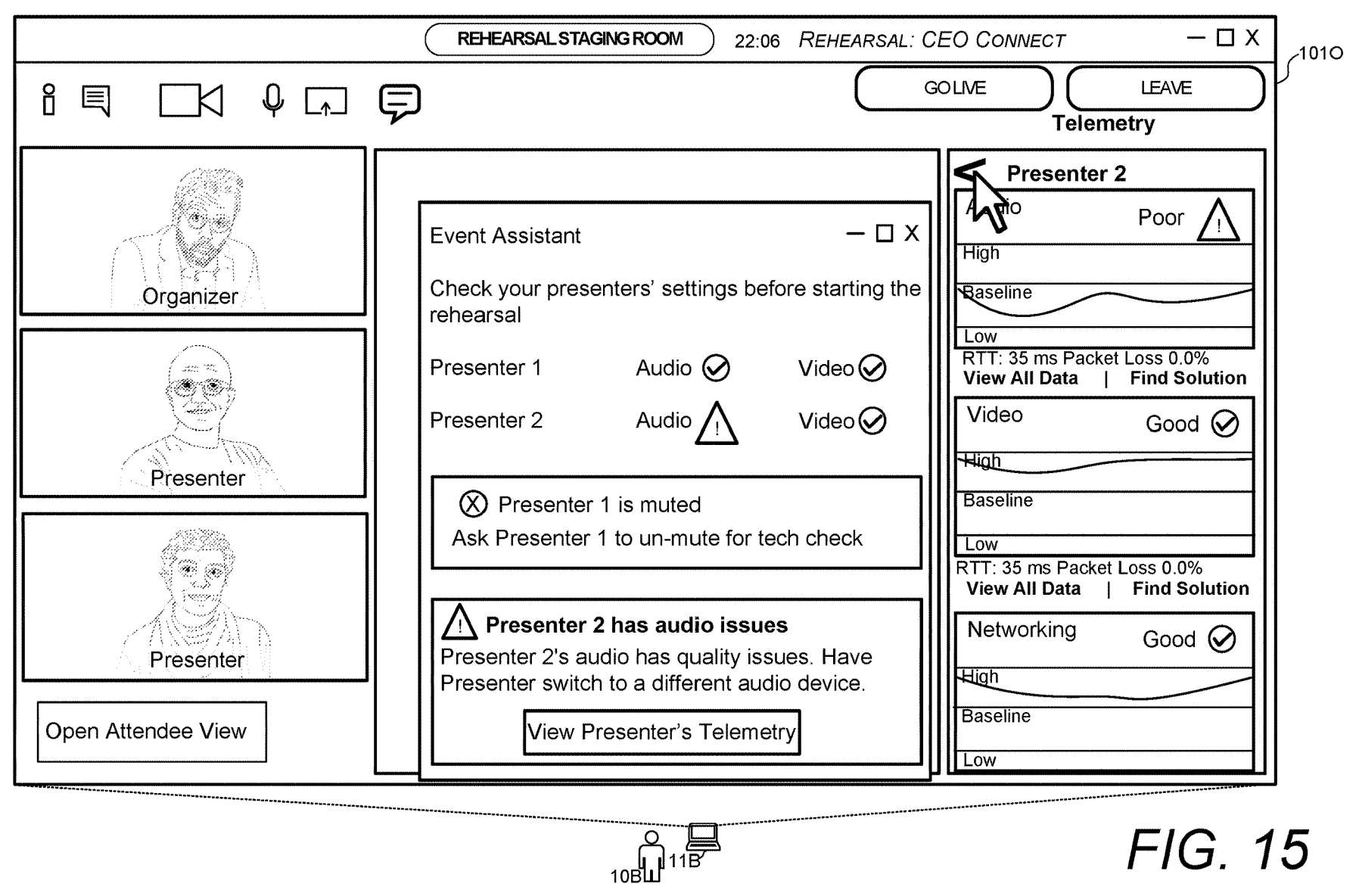

FIG. 15 shows the user interface displaying the telemetry data in response to the user selection of the back button on the solutions user interface. As the organizer, the system provides access to any presenter's telemetry data. This can show real-time audio and video quality data. Once the telemetry data is displayed, the user can select the back button and cause a display of an overview of the rehearsal staging room.

Figure 16:
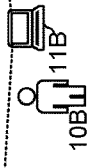
FIG. 16 shows a user interface displayed during a rehearsal meeting, where meeting details are displayed.

As shown in FIG. 16, the system displays a summary of the detected issues, and the solutions that were provided by the system. The system also summarizes the number of participants for the rehearsal staging room session and graphical charts of the telemetry data. This data can also be exported for analysis. The user interface also displays specific issues that are identified for each presenter and optimization suggestions such as a suggestion to use a headphone device instead of a speaker. The user interface also provides graphical elements that allows the organizer to view detailed telemetry data for each presenter.

Figure 17:
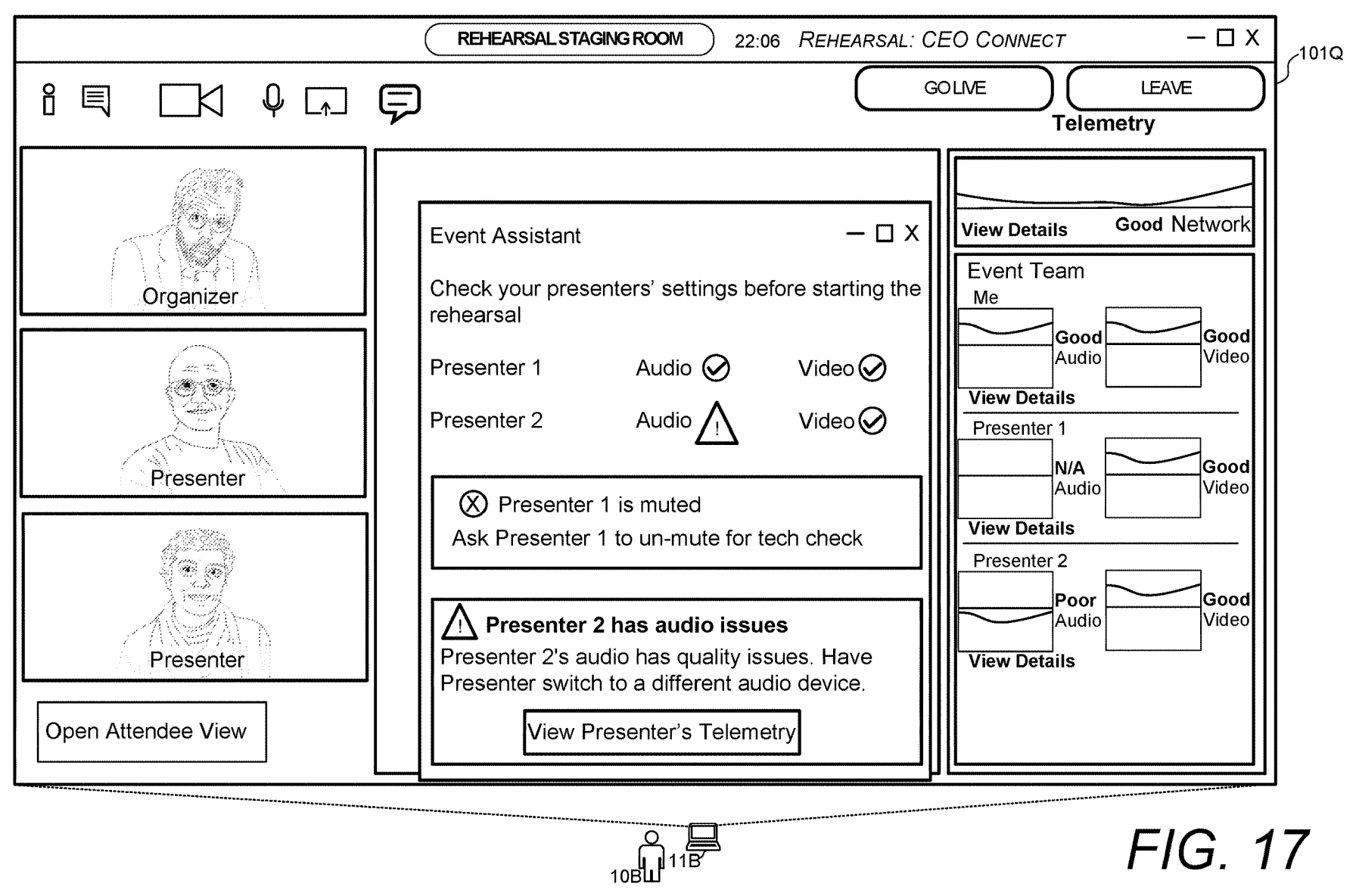

FIG. 17 shows the detailed telemetry data for each presenter. This example shows an overall network connection indicator and a historical graph of network performance readings for the rehearsal session. This user interface also provides audio and video telemetry data for the organizer and each presenter. If a particular presenter does not have an audio device, such as the audio data chart for the first presenter, the system will provide an indication of that status.

Figure 18:
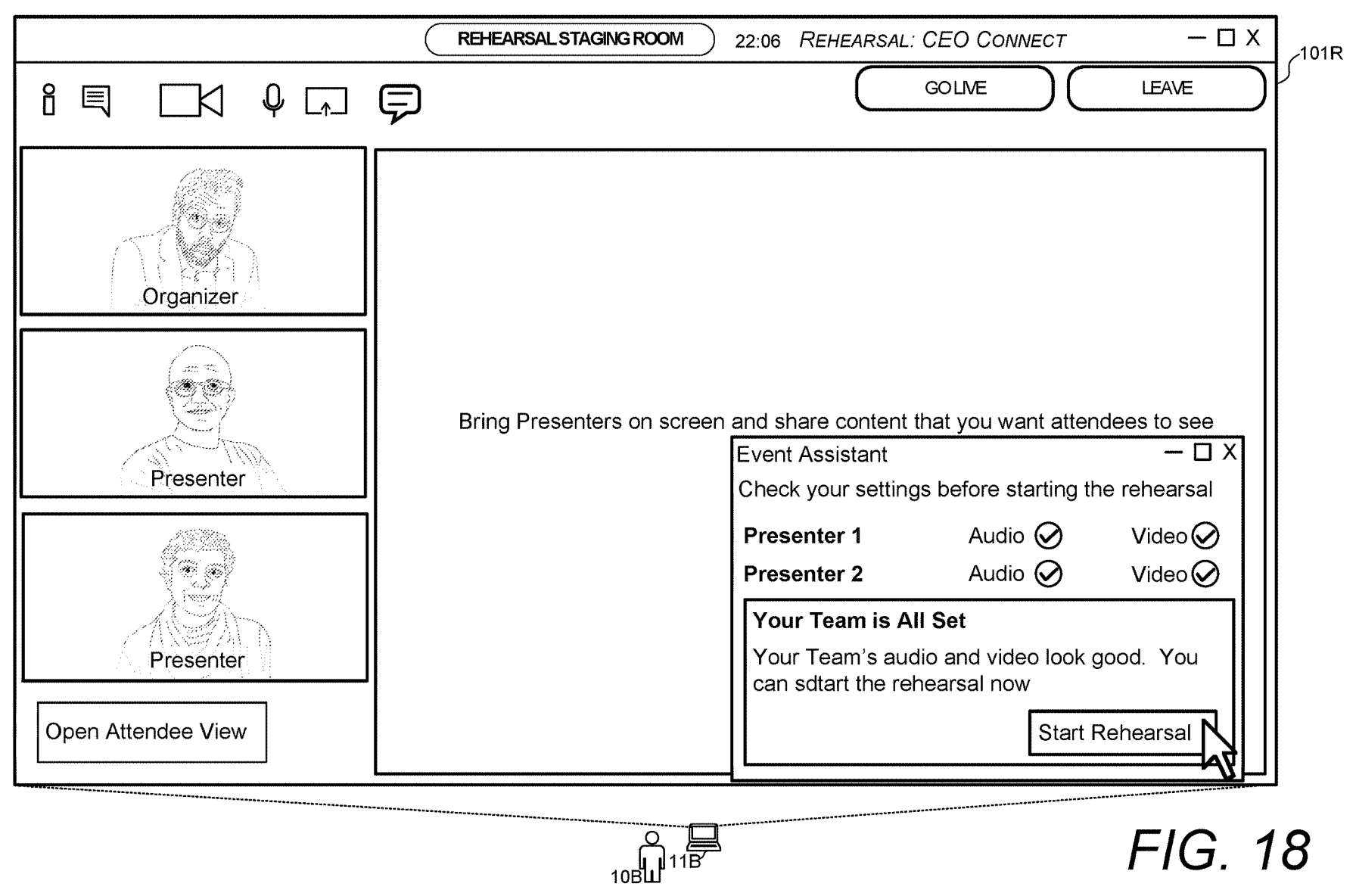

FIG. 18 allows the organizer to start a live rehearsal session that involves a simulation of the other attendees, such as the audience members. This user interface provide the start button that enables the organizer to have control of when the actual live rehearsal starts. This gives time for each of the presenters and the organizer to discuss any open issues. Once the user selects the start rehearsal button, the system can transition from a first operating state involving the rehearsal staging room to a second operating state involving a live rehearsal. As described below, the "live rehearsal" includes the use of bots and other systems to simulate other attendees, such as audience members.

Figure 19:
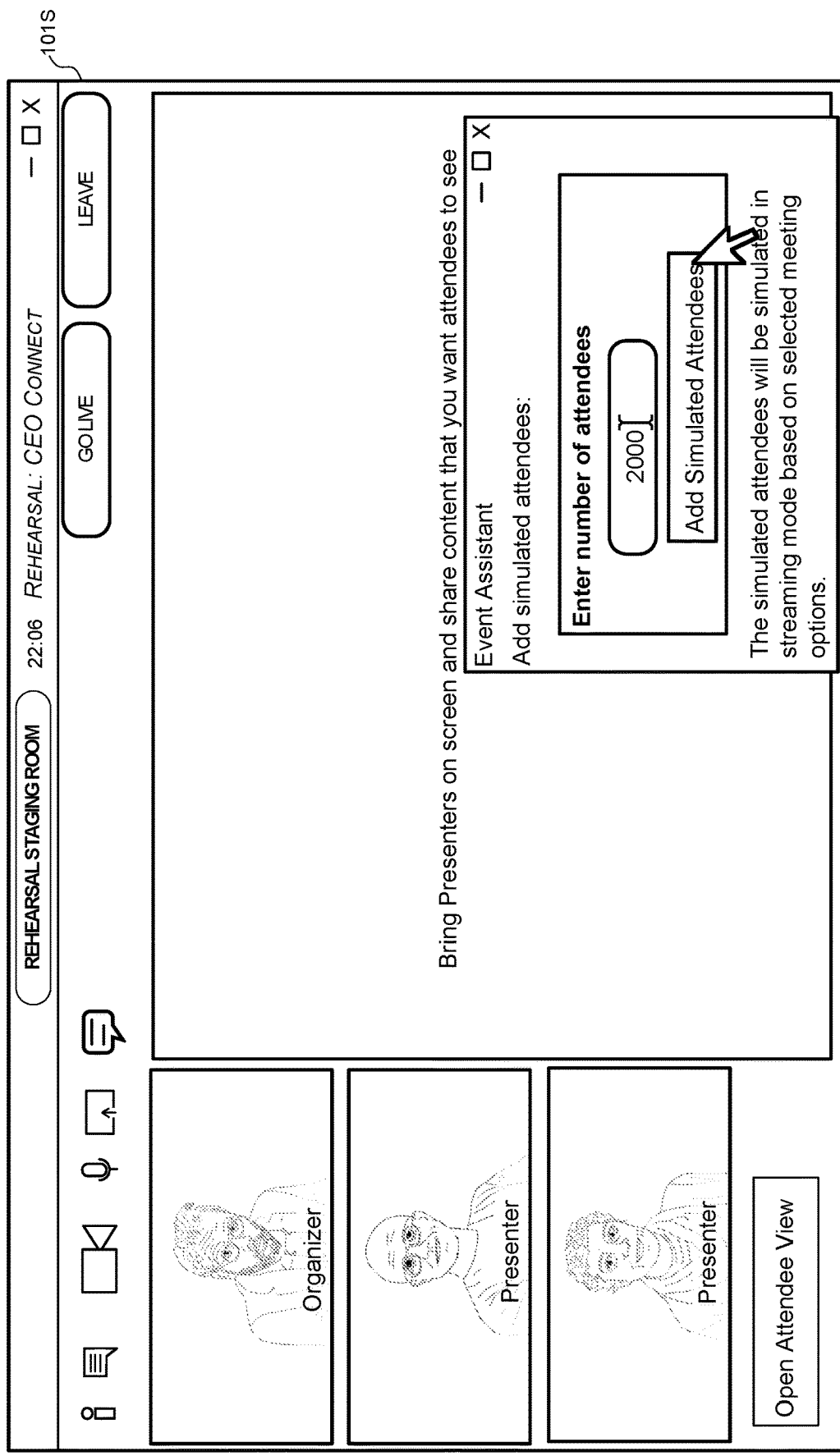
FIG. 19 shows a user interface displayed during a rehearsal meeting, where a device can receive an input indicating a number of bots used for simulating attendees.

FIG. 19 shows a configuration user interface for the live rehearsal. This user interface can be displayed in response to the user selecting the "start rehearsal" button in the previous user interface. The configuration user interface for the live rehearsal can include a text entry field that allows the organizer to enter the number of projected attendees. This allows the system to receive data indicating the size of the anticipated meeting. This allows the system to generate a number of bots that simulate the behavior of the attendees. This allows the system to test the overall load of the system based on the size of the actual event. The system can also automatically analyze the original meeting data and determine the number of attendees and enter this information automatically. In response to receiving this information or determining this information, the system can start a simulation, which is also referred to herein as the live rehearsal.

Figure 20:
FIG. 20 shows a map of geographical locations where computing resources are allocated for testing a system using simulated attendees using bots in the geographical locations.

In some configurations, the system can determine the location of people that are invited to the original meeting. Based on this location information of each attendee, the system can configure bots in various geographic locations to test network connections firewalls and other equipment involved in the original meeting. In one example, the system can analyze organizational data to determine the location of invitees to a meeting. When the system determines that the locations of each invitee are in different geographic regions, the system can configure computing devices in each region for the rehearsal session. For example, as shown in FIG. 20, if a meeting is stored in a particular meeting object and that meeting involves invitees that are located in Bangalore, Beijing, Bellevue, Redmond, and Rio, the system will allocate testing resources in those locations to test system configurations during the live rehearsal.

Figure 21:
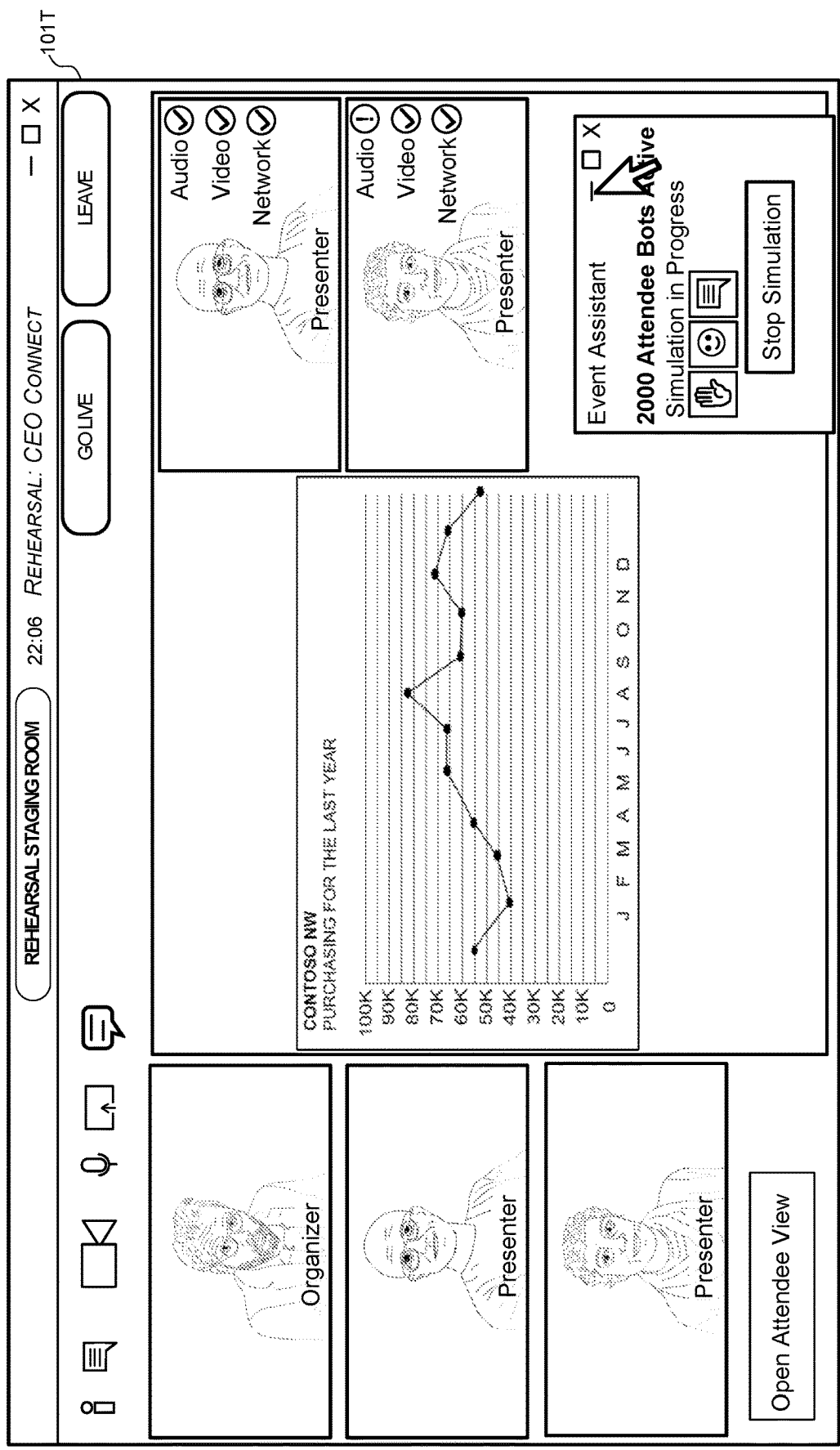
FIG. 21 shows a user interface displayed during a rehearsal, where a display shows an Event Assistant.

As shown in FIG. 21, the system can display a user interface that shows aspects of what each presenter will see during the original meeting. In addition, this user interface shows status indicators of audio, video and network measurements. The large user interface region on the right side of the screen shows what the presenter will see during the original meeting. The smaller user interface region on the left side of the screen shows video stream renderings of the presenters and the organizer(s). This user interface also shows an Event Assistant. The Event Assistant provides controls that allows the organizer to control activity of the bots the simulate the audience and a control button for stopping the simulation. This user interface also allows the organizer to minimize the Event Assistant, as shown by the user interface control icon under the pointer.

Figure 22:
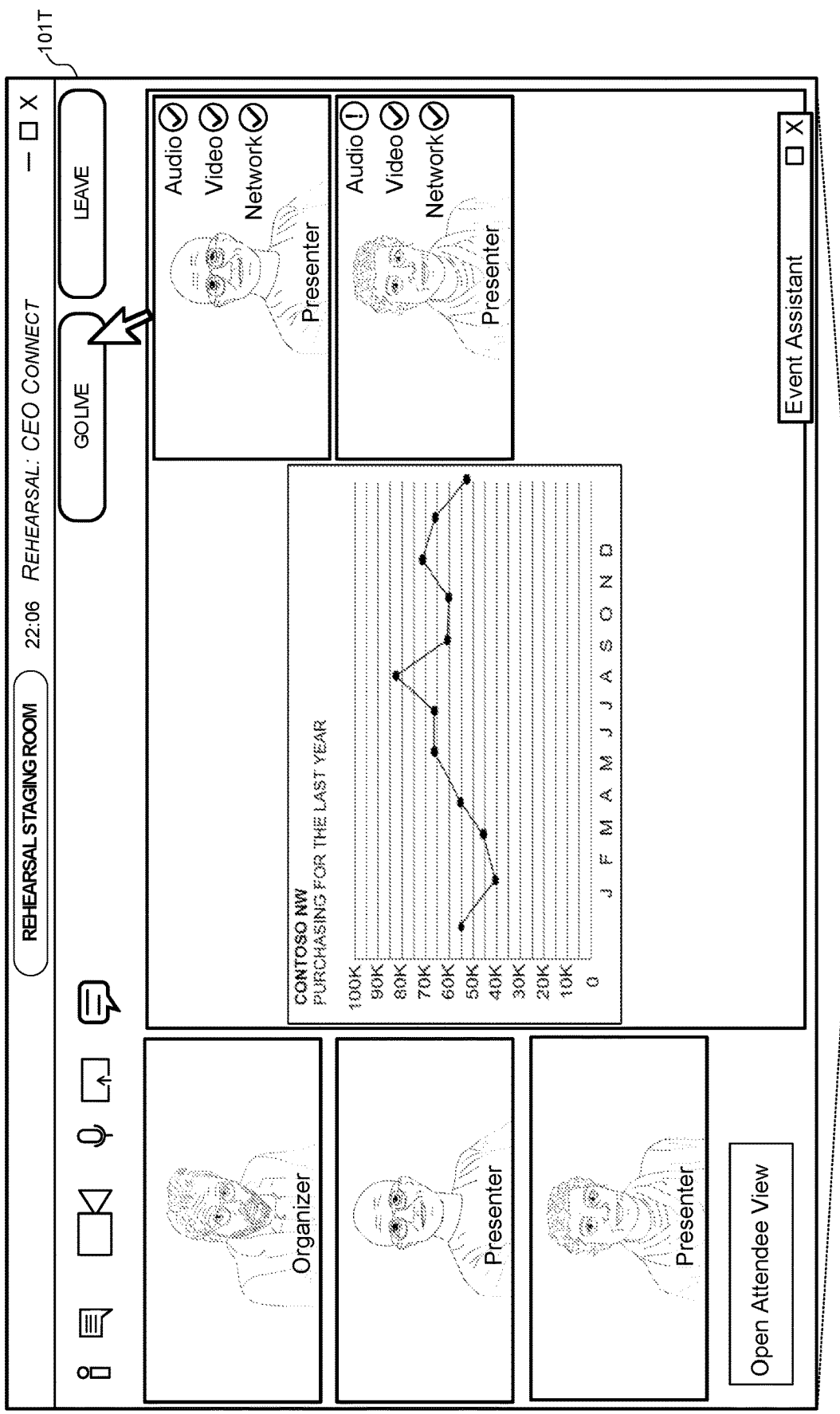
FIG. 22 shows a user interface displayed during a rehearsal, where a display shows buttons for activating a live rehearsal.
Figure 23:
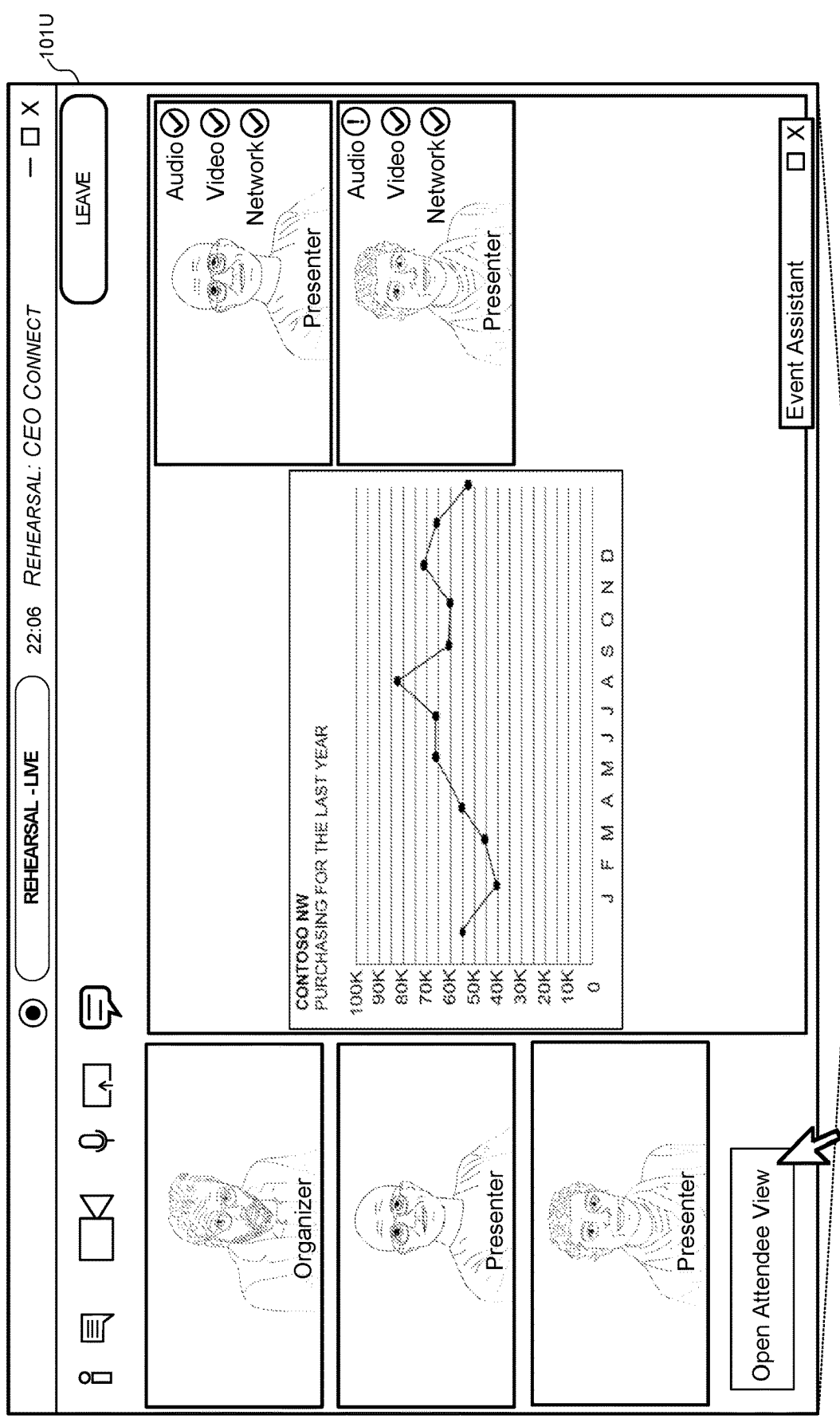
FIG. 23 shows a user interface displayed during a live rehearsal, where a display shows buttons for activating an attendee view.

FIG. 22 shows the rehearsal staging room user interface after the organizer has minimized the Event Assistant. In this stage of the process, the organizer can select the Go Live button. The Go Live button activates the bots and starts the live rehearsal. Once the bots are activated, as shown in FIG. 23, a status indicator is displayed on the user interface to show that the live rehearsal has started. The Go Live button causes the system to transition from a first operating mode involving the rehearsal staging room to a second operating mode involving the live rehearsal. The live rehearsal operating mode involves the active bots simulating the attendees.

FIG. 23 shows the live rehearsal session user interface after the organizer has activated the bots. As shown, this user interface provides a notification that the operating mode of the system has changed to the live rehearsal involving the active bots. While in the live rehearsal, the system allows the user to select the "Open Attendee View" button to allow the user to see what the attendees, e.g., what the audience will see during the original meeting.

Figure 24:
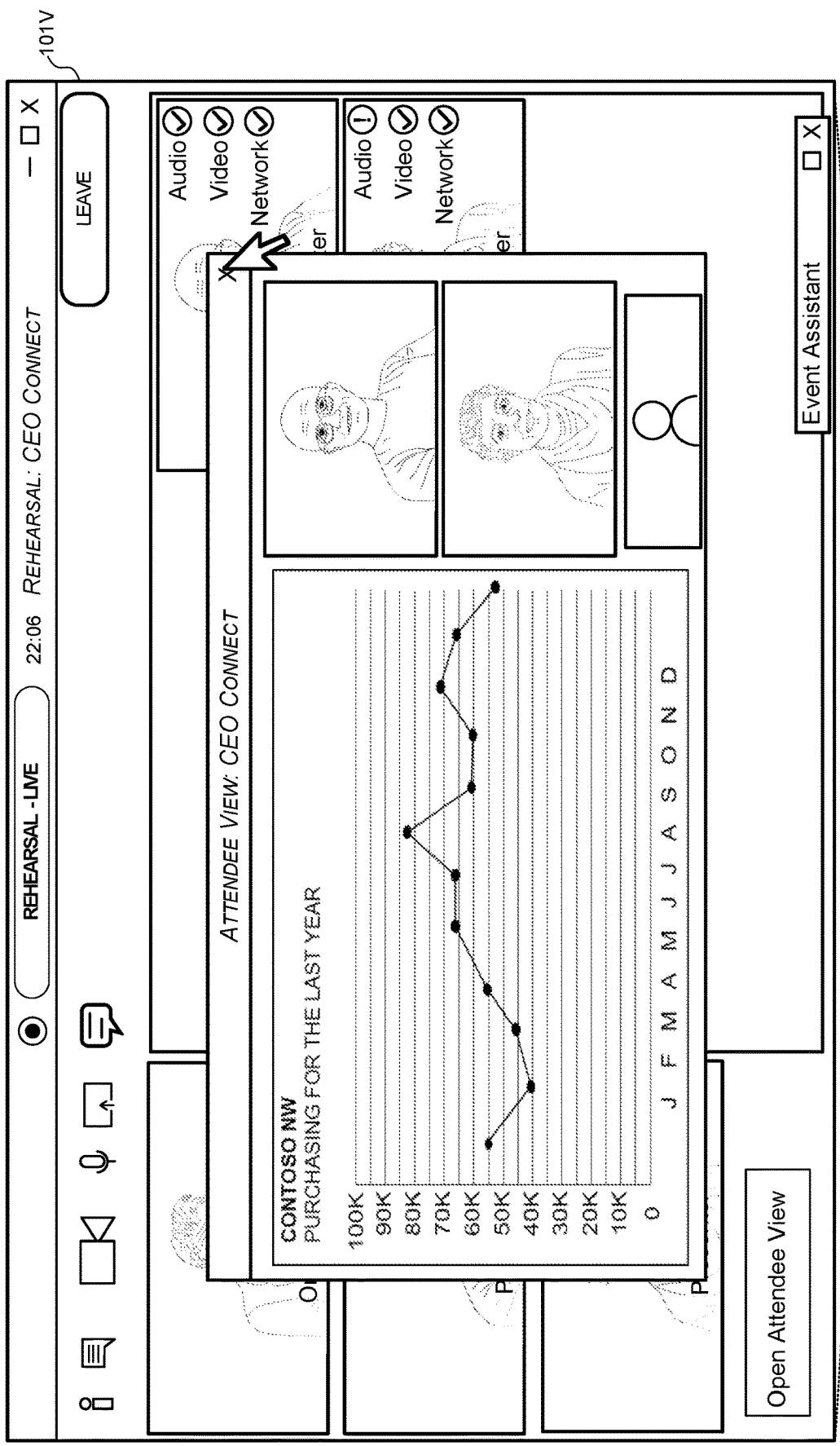
FIG. 24 shows a user interface displayed during a live rehearsal, where a display shows the attendee view.

FIG. 24 shows the Attendee View user interface after the organizer has activated the "Open Attendee View" button. This user interface allows the presenters to see what the audience members will see during the actual meeting. They can see the orientation of the shared content (left side), such as a slide deck or a video, it shows the arrangements of the presenters (upper right, middle right, and also a video stream of the attendee (lower right).

Figure 25:
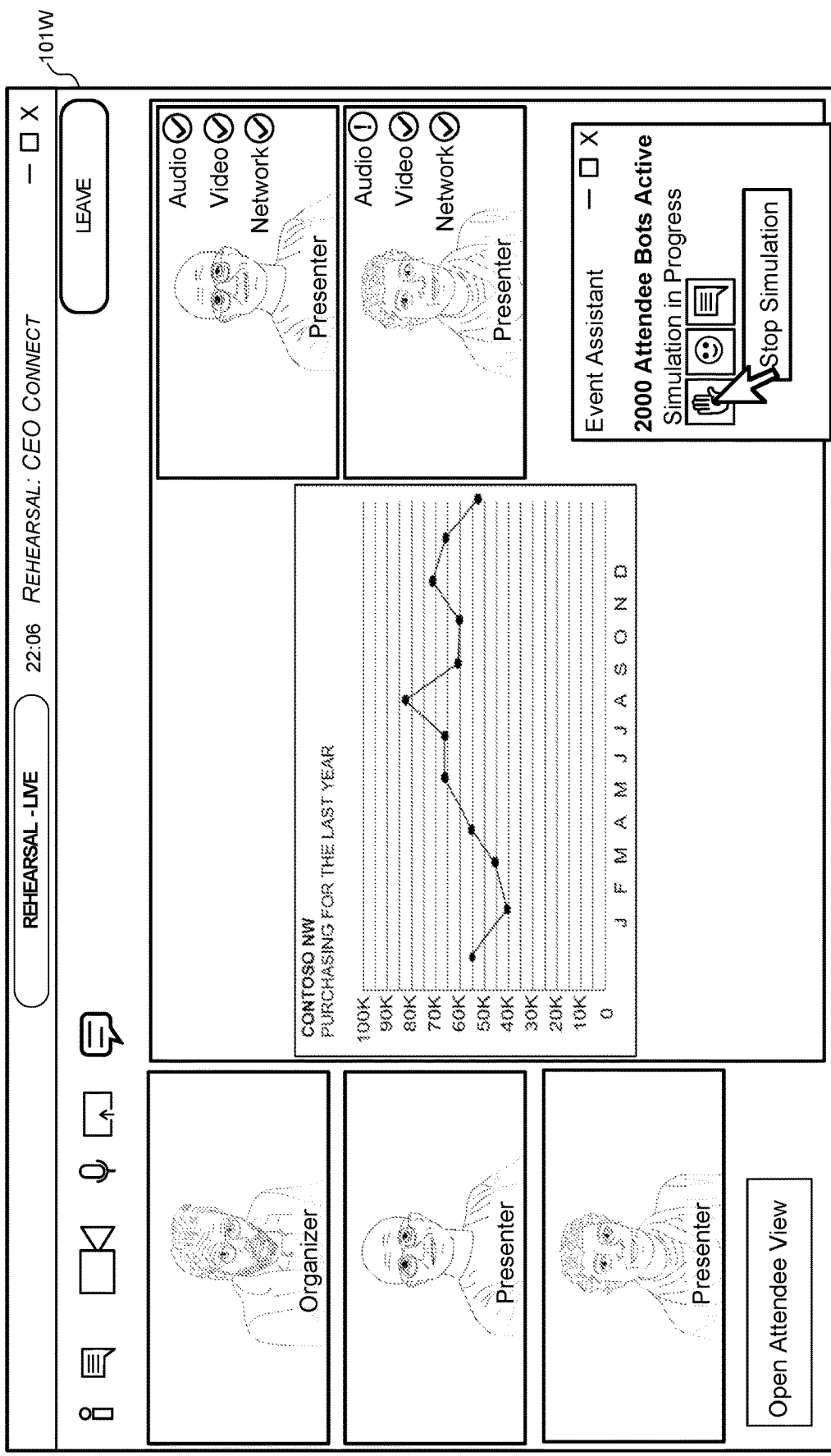
FIG. 25 shows a user interface displayed during a live rehearsal, where a display shows an Event Assistant used to simulate attendee activity.

FIG. 25 shows an example of how a user interacts with the Event Assistant to simulate the activities of the audience members. And this is an example, the organizer selects the "hand raise" button. This causes one or more bots simulating the activity of an audience member, e.g., a simulation that generates a signal indicating that an audience member has raised their hand and wishes to share information.

Figure 26:
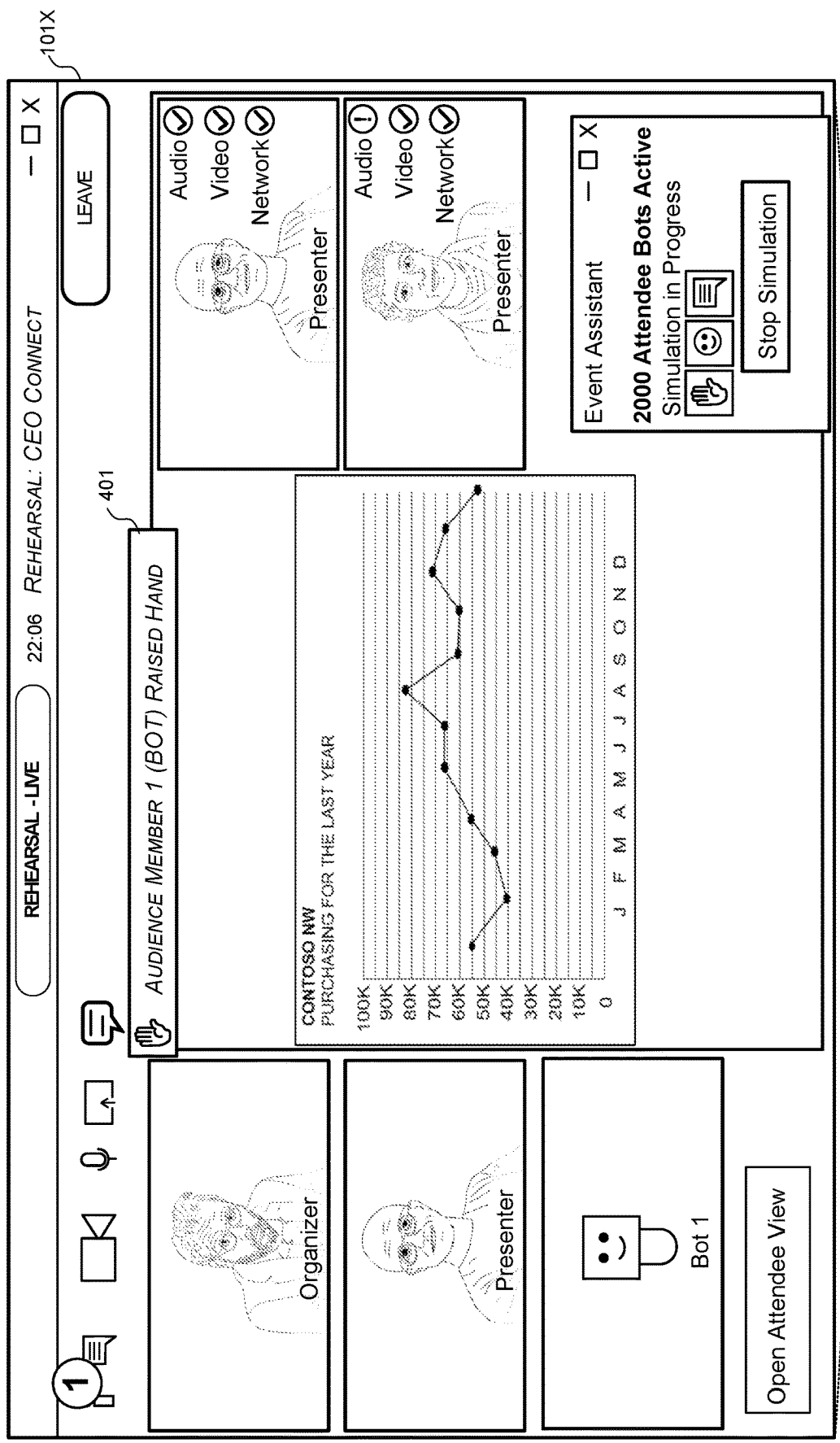
FIG. 26 shows a user interface displayed during a live rehearsal, where a display shows the result of an input to the Event Assistant used to simulate attendee activity.

FIG. 26 shows an example of a hand raise indicator 401 that is displayed in response to the simulation of the hand raise, e.g., in response to the organizer hitting the "hand raise" button. This allows the organizers to show the presenters where the hand raise indicator 401 will be displayed during the meeting. This may be helpful to demonstrate features of the communication program, especially helpful for users who are not familiar with the program. Other features can cause the bots to generate emoji responses and text messages to allow the presenters to see how each of the features can be displayed.

Figure 27:
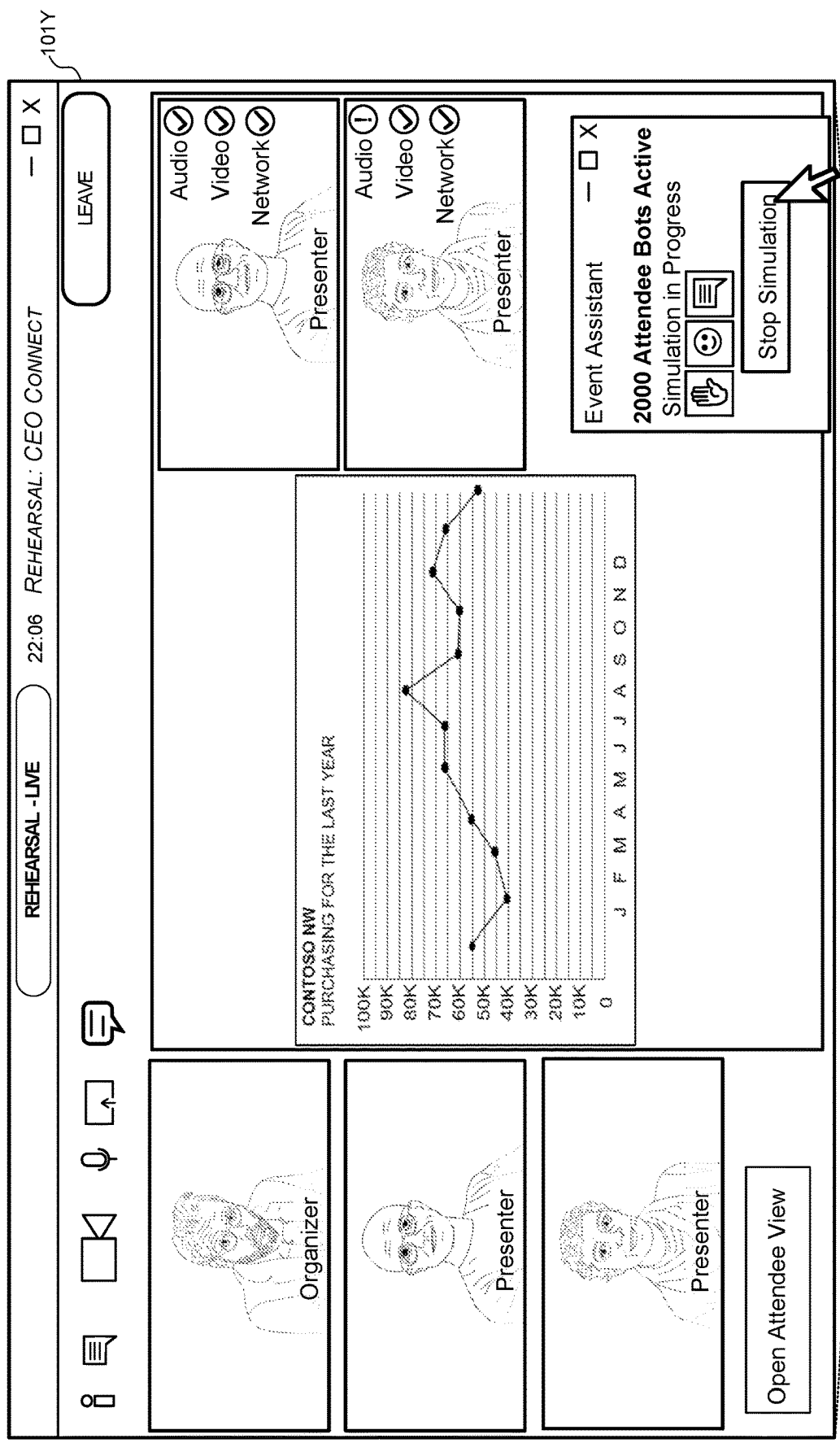
FIG. 27 shows a user interface displayed during a live rehearsal, where a display shows a button for stopping the simulation.

As shown in FIG. 27, the user selects the "Stop Simulation" button to stop the live rehearsal. When the simulation is terminated, as shown in FIG. 28, the system generates a summary of the live rehearsal period this report can provide an overall summary weather the simulation was successful or not successful. This summary also indicates the issues that were detected during the rehearsal staging room phase and the live rehearsal stage. The summary also indicates the installation of certain applications, such as a Poll application. as noted herein, the software features can be installed and configured for the rehearsal in response to detecting that the applications where selected for the original meeting object. Thus, if an original meeting is set up having a Poll feature, e.g., a vote collection feature, the rehearsal meeting object will also include that same feature.

Figure 29:
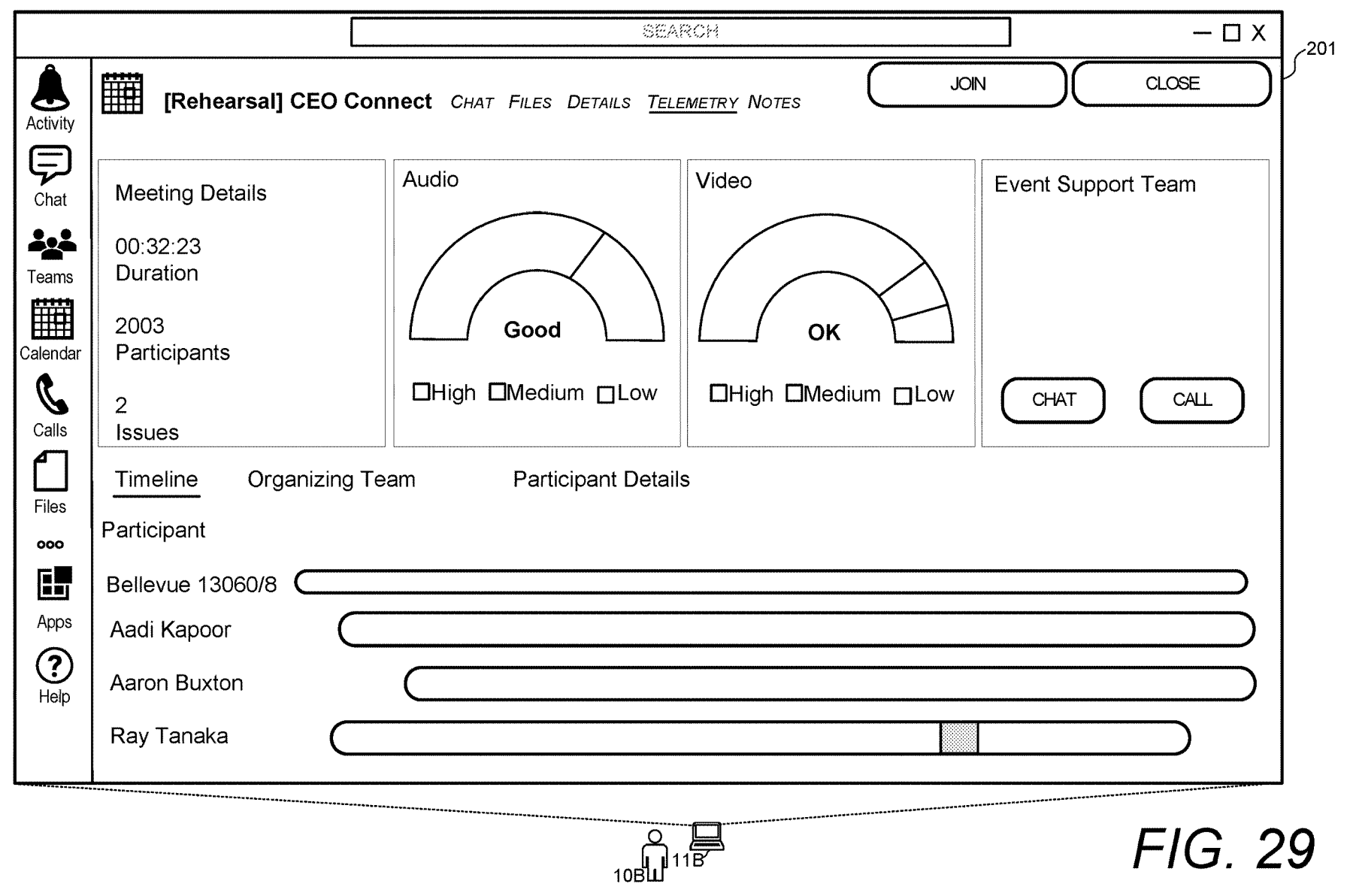

FIG. 29 shows a full report that is generated in response to the data that is collected during the rehearsal staging room and the live rehearsal. This report can show meeting details such as the number of overall participants, real participants and simulated participants, and the meeting duration and the number of issues that are identified. Other graphical indicators can be provided to show the audio and video readings during the meeting. This can be summarized by providing simplified indicators, such as good, OK or failed. This report can also show participation timelines of the real participants and the simulated participants. This shows when each person or bot joined the session, left the session, and when there were points of failure (the shaded section of the activity bar for Ray Tanaka). The report can also include feedback by each participant.

Figure 30:
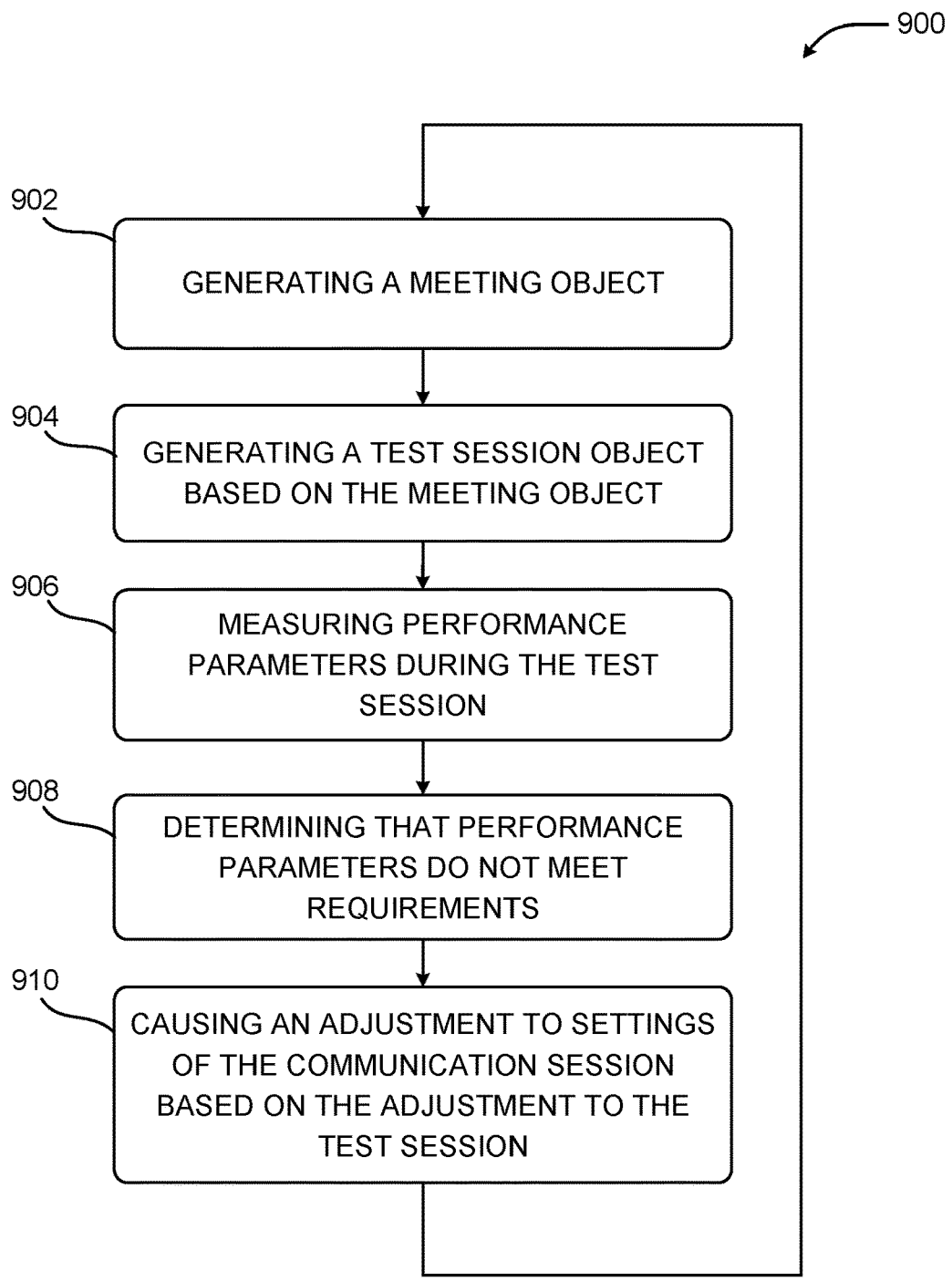
FIG. 30 is a flow diagram illustrating aspects of a sample routine for implementing the techniques disclosed herein.

FIG. 30 is a diagram illustrating aspects of a routine 900 for computationally efficient management of automated rehearsal sessions. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 30 and the other FIGURES can be implemented in association with the example presentation user interface(s) (UI) described above. For instance, the various device(s) and/or module(s) described herein can generate, transmit, receive, and/or display data associated with content of a communication session (e.g., live content, broadcasted event, recorded content, etc.) and/or a presentation UI that includes renderings of one or more participants of remote computing devices, avatars, channels, chat sessions, video streams, images, virtual objects, and/or applications associated with a communication session.

The routine 900 starts at operation 902 where the system generates a meeting object defining the communication session for the plurality of users, where the meeting object defines a meeting start time and roles for individual users of the plurality of users. The meeting object can be generated by a meeting wizard that prompts the user for parameters of an original meeting. For illustrative purposes, the original meeting (also referred to herein as a "communication session") is referred to herein as the meeting that is to be established by an organizer or a presenter. The rehearsal session is another meeting that contains a subset of users invited to the original meeting.

At operation, 904, using the meeting object, the system generates a test session object defining the test session for a subset of users of the plurality of users, the subset of users selected based on a predetermined roles assigned in the meeting object for the subset of users. The test session object defining a test start time that is prior to the meeting start time. The test session is also referred to herein as the rehearsal session. The system copies parameters and other software objects from the meeting object to populate parameters and software objects in the test session object, e.g., the rehearsal session object defining the rehearsal session.

At operation 906, the system measures performance parameters during the test session for at least one of network bandwidth, audio volume, image quality. The system can record this information and display it in real time to users that are invited to the test session. This is referred to herein as the telemetry data.

At operation 908, the system determines that one or more performance parameters do not meet one or more threshold requirements. This includes a network bandwidth measurement that does not meet a threshold, an audio quality metric that does not meet an audio threshold, or a video quality metric that does not meet a video threshold. A parameter may also include optimization measurements such as a device type that does not meet a quality threshold. For example, if a computer speaker is detected by a device and a chart indicates that a headphone speaker is higher quality, the system may determine that the computer speaker does not meet the threshold requirements and the system will recommend a headphone.

At operation 910, in response to determining that the one or more performance parameters do not meet the one or more threshold requirements, the system generates data defining an adjustment to one or more settings that control the performance parameters of the test session. This can be in the form of a notification or a comment within a summary that indicates that an adjustment to a meeting option needs to be made. This could include a notification that a user should change hardware, change a setting, close applications, etc. The system can also automatically change a setting or option in the test session. For instance, if a microphone is not producing an appropriate level for a signal, the system may increase the volume for that microphone response to determining that the measured performance parameter does not meet a threshold.

Any recommended adjustment or any adjustment made to the test session can also be applied to the communication session. Thus, the system can measure activity during a test session, determine if a setting is incorrect for the test session, then make adjustments to the test session parameters and or the original meeting parameters. This part of the process can include audio measurements, video measurements and network performance measurements. The thresholds can include volume, sound quality, video quality, brightness levels, jitter thresholds, bandwidth thresholds for individuals, or bandwidth thresholds for a group of individuals. For example, the system may measure performance parameters during the test session, wherein the performance parameters include at least one of a network bandwidth parameter, an audio parameter, or a video parameter. If the system detects a packet loss rate that exceeds a threshold, the system can determine that a test has failed and the system can generate one or more solutions to fix that issue. In another example, if the system detects that a frame rate for a video is below a threshold, the system can determine that a test has failed and the system can generate an appropriate solution. The solutions can include adjustments to a setting or an option, e.g., a selection of a particular network driver or a selection for a particular device, those adjustments can be made to the settings for the rehearsal session, and at the same time, those adjustments can be made in the original meeting. So, when the original meeting starts, those settings will automatically be present for the live meeting. In another example, if a volume setting is changed in the rehearsal, the system will also copy that change in the original meeting object.

The system can also copy software plugins from the test session object to the original meeting object. For instance, if the organizer determines, during a test session, that a question and answer object for facilitating functionality of a question and answer session is needed, the system can also install that object into the meeting object for the original meeting.

The system can also change permissions for individuals during a test session. For example, if an organizer determines that an audience has rights to share content but the presenters determined that it is preferred to have restrictions that prevent audience members to share content, the system can change the permissions of the bots simulating the audience members in the test session. In addition, the system can update permissions for the audience members in the original meeting object. This provides increased security by helping meeting organizers control permissions at a macro level instead of requiring a user to change individual settings for each person or each role in a meeting.

The routine can also store any measurements that were collected during the rehearsal session and apply them to a machine learning model. The model can store adjustments that were made to a rehearsal session and adjustments that were made to a original meeting. The system can then determine if those adjustments were used in the original meeting or in any subsequent rehearsal session. If those adjustments are used or if feedback indicates that the adjustment was successful, the system can save those adjustments for future iterations of the routine. This allows adjustments that are preferred, or adjustments that are deemed to be successful, to be prioritized in future iterations of the routine. That way, suggestions or adjustments to parameters that are deemed to be successful or used often can be suggested more frequently in future meetings and rehearsal sessions. These adjustments to the machine learning model can be made in operation 910. Then, the routine can return to operation 902 in future iterations of the routine whether routine can utilize these adjusted models.

Figure 31:
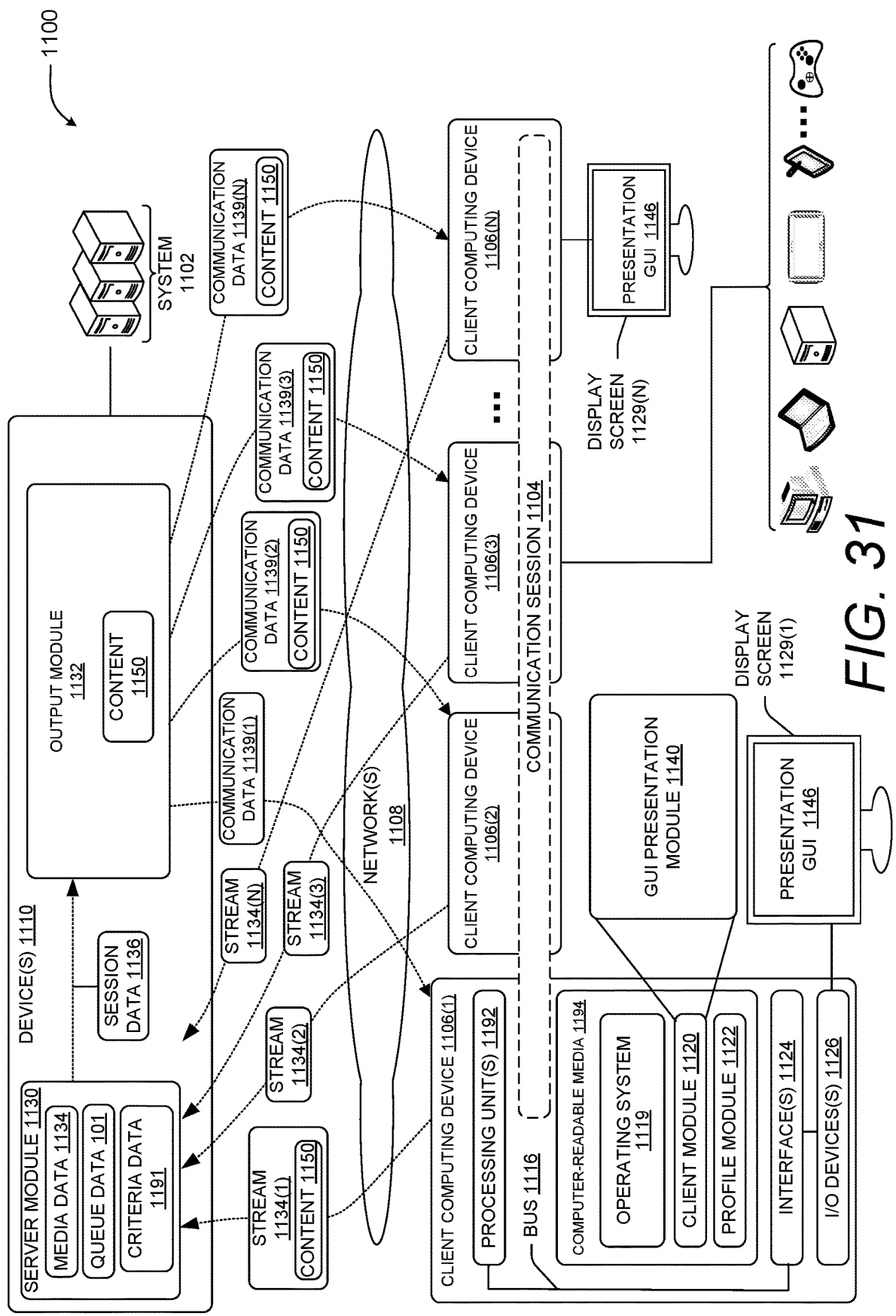
FIG. 31 is a computing system diagram showing aspects of an illustrative operating environment for the techniques disclosed herein.

FIG. 31 is a diagram illustrating an example environment 1100 in which a system 1102 (which can be system 100 of FIG. 1) can implement the techniques disclosed herein. In some implementations, a system 1102 may function to collect, analyze, and share data defining one or more objects that are displayed to users of a communication session 1104.

As illustrated, the communication session 1104 may be implemented between a number of client computing devices 1106(1) through 1106(N) (where N is a number having a value of two or greater) that are associated with the system 1102 or are part of the system 1102. The client computing devices 1106(1) through 1106(N) enable users, also referred to as individuals, to participate in the communication session 1104.

In this example, the communication session 1104 is hosted, over one or more network(s) 1108, by the system 1102. That is, the system 1102 can provide a service that enables users of the client computing devices 1106(1) through 1106(N) to participate in the communication session 1104 (e.g., via a live viewing and/or a recorded viewing). Consequently, a "participant" to the communication session 1104 can comprise a user and/or a client computing device (e.g., multiple users may be in a room participating in a communication session via the use of a single client computing device), each of which can communicate with other participants. As an alternative, the communication session 1104 can be hosted by one of the client computing devices 1106(1) through 1106(N) utilizing peer-to-peer technologies. The system 1102 can also host chat conversations and other team collaboration functionality (e.g., as part of an application suite).

In some implementations, such chat conversations and other team collaboration functionality are considered external communication sessions distinct from the communication session 1104. A computerized agent configured to collect participant data in the communication session 1104 may be able to link to such external communication sessions. Therefore, the computerized agent may receive information, such as date, time, session particulars, and the like, that enables connectivity to such external communication sessions. In one example, a chat conversation can be conducted in accordance with the communication session 1104. Additionally, the system 1102 may host the communication session 1104, which includes at least a plurality of participants co-located at a meeting location, such as a meeting room or auditorium, or located in disparate locations.

In examples described herein, client computing devices 1106(1) through 1106(N) participating in the communication session 1104 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that captures the appearance and speech of a user participating in the communication session). In some implementations, the video feeds may comprise such audio and visual data, one or more still images, and/or one or more avatars. The one or more still images may also comprise one or more avatars.

Another example of an individual stream of live and/or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live and/or recorded content within the communication data enable a remote meeting to be facilitated between a group of people and the sharing of content within the group of people. In some implementations, the various streams of live and/or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 1104 live as activity occurs, or alternatively, via a recording at a later time after the activity occurs. In examples described herein, client computing devices 1106(1) through 1106(N) participating in the communication session 1104 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee of a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 1102 includes device(s) 1110. The device(s) 1110 and/or other components of the system 1102 can include distributed computing resources that communicate with one another and/or with the client computing devices 1106(1) through 1106(N) via the one or more network(s) 1108. In some examples, the system 1102 may be an independent system that is tasked with managing aspects of one or more communication sessions such as communication session 1104. As an example, the system 1102 may be managed by entities such as SLACK, WEBEX, GOTOMEETING, GOOGLE HANGOUTS, etc.

Network(s) 1108 may include, for example, public networks such as the Internet, private networks such as an institutional and/or personal intranet, or some combination of private and public networks. Network(s) 1108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 1108 may utilize communications protocols, including packet-based and/or datagram-based protocols such as Internet protocol ("IP"), transmission control protocol ("TCP"), user datagram protocol ("UDP"), or other types of protocols. Moreover, network(s) 1108 may also include a number of devices that facilitate network communications and/or form a hardware basis for the networks, such as switches, routers, gateways, access points, firewalls, base stations, repeaters, backbone devices, and the like.

In some examples, network(s) 1108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 1110 may include one or more computing devices that operate in a cluster or other grouped configuration to share resources, balance load, increase performance, provide fail-over support or redundancy, or for other purposes. For instance, device(s) 1110 may belong to a variety of classes of devices such as traditional server-type devices, desktop computer-type devices, and/or mobile-type devices. Thus, although illustrated as a single type of device or a server-type device, device(s) 1110 may include a diverse variety of device types and are not limited to a particular type of device. Device(s) 1110 may represent, but are not limited to, server computers, desktop computers, web-server computers, personal computers, mobile computers, laptop computers, tablet computers, or any other sort of computing device.

A client computing device (e.g., one of client computing device(s) 1106(1) through 1106(N)) may belong to a variety of classes of devices, which may be the same as, or different from, device(s) 1110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 1106(1) through 1106(N) of the various classes and device types can represent any type of computing device having one or more data processing unit(s) 1192 operably connected to computer-readable media 1194 such as via a bus 1116, which in some instances can include one or more of a system bus, a data bus, an address bus, a PCI bus, a Mini-PCI bus, and any variety of local, peripheral, and/or independent buses.

Executable instructions stored on computer-readable media 1194 may include, for example, an operating system 1119, a client module 1120, a profile module 1122, and other modules, programs, or applications that are loadable and executable by data processing units(s) 1192.

Client computing device(s) 1106(1) through 1106(N) may also include one or more interface(s) 1124 to enable communications between client computing device(s) 1106(1) through 1106(N) and other networked devices, such as device(s) 1110, over network(s) 1108. Such network interface(s) 1124 may include one or more network interface controllers (NICs) or other types of transceiver devices to send and receive communications and/or data over a network. Moreover, client computing device(s) 1106(1) through 1106(N) can include input/output ("I/O") interfaces (devices) 1126 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 31 illustrates that client computing device 1106(1) is in some way connected to a display device (e.g., a display screen 1129(1)), which can display a UI according to the techniques described herein.

In the example environment 1100 of FIG. 31, client computing devices 1106(1) through 1106(N) may use their respective client modules 1120 to connect with one another and/or other external device(s) in order to participate in the communication session 1104, or in order to contribute activity to a collaboration environment. For instance, a first user may utilize a client computing device 1106(1) to communicate with a second user of another client computing device 1106(2). When executing client modules 1120, the users may share data, which may cause the client computing device 1106(1) to connect to the system 1102 and/or the other client computing devices 1106(2) through 1106(N) over the network(s) 1108.

The client computing device(s) 1106(1) through 1106(N) may use their respective profile modules 1122 to generate participant profiles (not shown in FIG. 31) and provide the participant profiles to other client computing devices and/or to the device(s) 1110 of the system 1102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 31, the device(s) 1110 of the system 1102 include a server module 1130 and an output module 1132. In this example, the server module 1130 is configured to receive, from individual client computing devices such as client computing devices 1106(1) through 1106(N), media streams 1134(1) through 1134(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 1130 is configured to receive a collection of various media streams 1134(1) through 1134(N) during a live viewing of the communication session 1104 (the collection being referred to herein as "media data 1134"). In some scenarios, not all of the client computing devices that participate in the communication session 1104 provide a media stream. For example, a client computing device may only be a consuming, or a "listening," device such that it only receives content associated with the communication session 1104 but does not provide any content to the communication session 1104. A communication session 1104 can have a start time and an end time, or a communication session 1104 can be ongoing. A communication session 1104 can also be categorized as an event and have stages, with each stage causing a computer to change roles for individual users as an event transitions through each stage.

In various examples, the server module 1130 can select aspects of the media streams 1134 that are to be shared with individual ones of the participating client computing devices 1106(1) through 1106(N). Consequently, the server module 1130 may be configured to generate session data 1136 based on the streams 1134 and/or pass the session data 1136 to the output module 1132. Then, the output module 1132 may communicate communication data 1139 to the client computing devices (e.g., client computing devices 1106(1) through 1106(N) participating in a live viewing of the communication session). The communication data 1139 may include video, audio, and/or other content data, provided by the output module 1132 based on content 1150 associated with the output module 1132 and based on received session data 1136. The device(s) 1110 of the system 1102 can also access queue data 101 described above in connection with FIG. 1, and criteria data 1191 for defining criteria and/or thresholds described herein. The criteria data 1191 can also include machine learning data accessible by a machine learning service or a machine learning module, which can be part of the server module 1130 or part of a remote machine learning service, such as those that are accessible by a public API at a site run by IBM, Google, or Microsoft.

As shown, the output module 1132 transmits communication data 1139(1) to client computing device 1106(1), and transmits communication data 1139(2) to client computing device 1106(2), and transmits communication data 1139(3) to client computing device 1106(3), etc. The communication data 1139 transmitted to the client computing devices can be the same or can be different (e.g., positioning of streams of content within a user interface may vary from one device to the next).

In various implementations, the device(s) 1110 of the system 1102 and/or the client module 1120 can include GUI presentation module 1140. The GUI presentation module 1140 may be configured to analyze communication data 1139 that is for delivery to one or more of the client computing devices 1106. Specifically, the UI presentation module 1140, at the device(s) 1110 and/or the client computing device 1106, may analyze communication data 1139 to determine an appropriate manner for displaying video, image, and/or content on the display screen 1129 of an associated client computing device 1106. In some implementations, the GUI presentation module 1140 may provide video, images, and/or content to a presentation GUI 1146 rendered on the display screen 1129 of the associated client computing device 1106. The presentation GUI 1146 may be caused to be rendered on the display screen 1129 by the GUI presentation module 1140. The presentation GUI 1146 may include the video, images, and/or content analyzed by the GUI presentation module 1140.

In some implementations, the presentation GUI 1146 may include a plurality of sections or grids that may render or comprise video, image, and/or content for display on the display screen 1129. For example, a first section of the presentation GUI 1146 may include a video feed of a presenter or individual, and a second section of the presentation GUI 1146 may include a video feed of an individual consuming meeting information provided by the presenter or individual. The GUI presentation module 1140 may populate the first and second sections of the presentation GUI 1146 in a manner that properly imitates an environment experience that the presenter and the individual may be sharing.

In some implementations, the GUI presentation module 1140 may enlarge or provide a zoomed view of the individual represented by the video feed in order to highlight a reaction, such as a facial feature, the individual had to the presenter. In some implementations, the presentation GUI 1146 may include a video feed of a plurality of participants associated with a meeting, such as a general communication session. In other implementations, the presentation GUI 1146 may be associated with a channel, such as a chat channel, enterprise teams channel, or the like. Therefore, the presentation GUI 1146 may be associated with an external communication session that is different than the general communication session.

Figure 32:
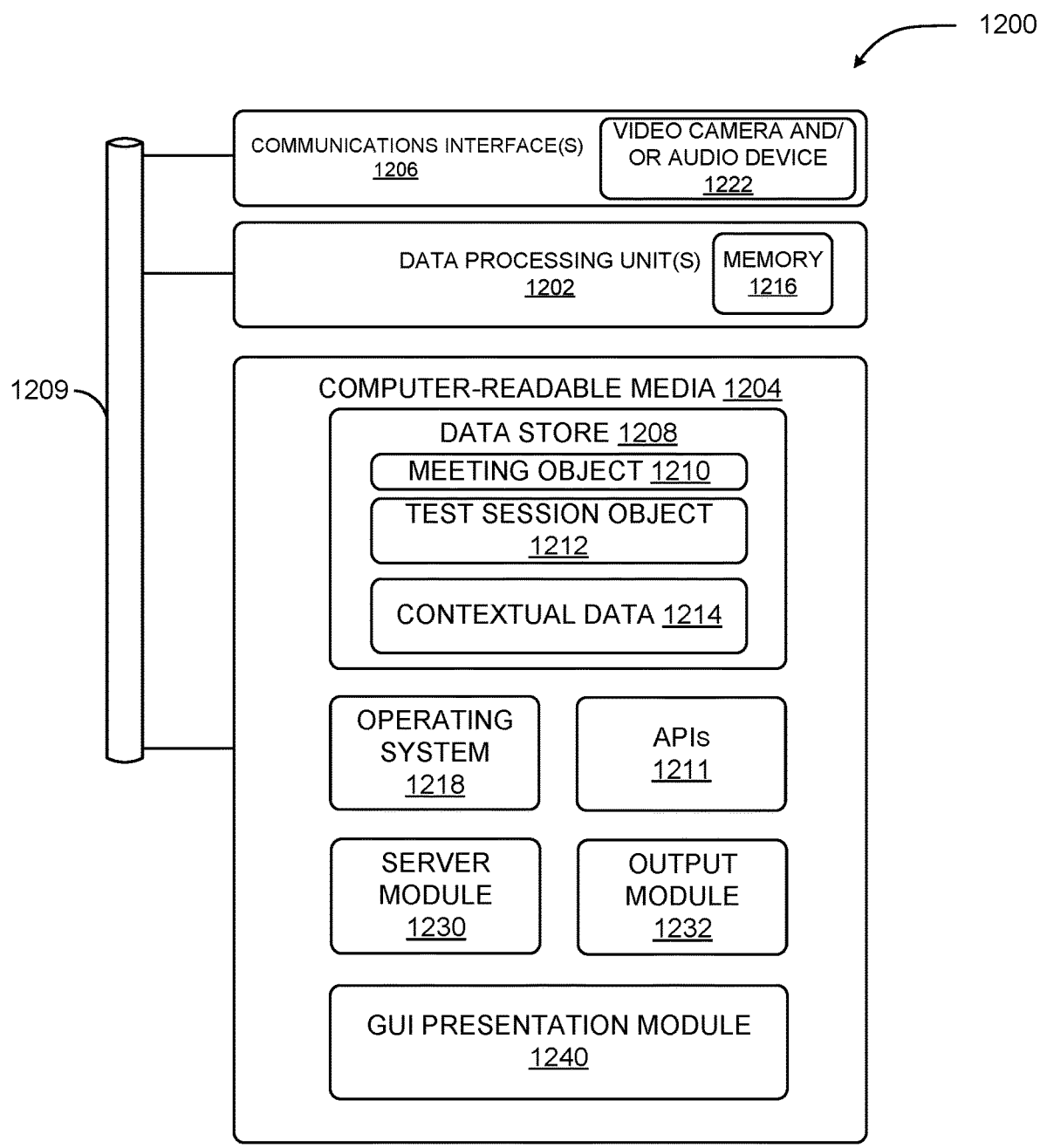
FIG. 32 is a computing architecture diagram showing aspects of the configuration and operation of a computing device that can implement aspects of the techniques disclosed herein.

FIG. 32 illustrates a diagram that shows example components of an example device 1200 (also referred to herein as a "computing device") configured to generate and process data for some of the user interfaces disclosed herein. The device 1200 may generate data that may include one or more sections that may render or comprise video, images, and/or content for display on the display screen 1129. The device 1200 may represent one of the device(s) described herein. Additionally, or alternatively, the device 1200 may represent one of the client computing devices 1106.

As illustrated, the device 1200 includes one or more data processing unit(s) 1202, computer-readable media 1204 (also referred to herein as computer storage medium 1204), and communication interface(s) 1206. The components of the device 1200 are operatively connected, for example, via a bus 1209, which may include one or more of a system bus, a data bus, an address bus, a PCI bus, a Mini-PCI bus, and any variety of local, peripheral, and/or independent buses.

As utilized herein, data processing unit(s), such as the data processing unit(s) 1202 and/or data processing unit(s) 1192, may represent, for example, a CPU-type data processing unit, a GPU-type data processing unit, a field-programmable gate array ("FPGA"), another class of digital signal processors ("DSPs"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 1204 and computer-readable media 1194, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. "Computer storage media," "non-transitory computer storage media," or "non-transitory computer-readable media" may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media or variants of this term noted above includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or any storage medium that can be used to locally store and maintain information for access at a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 1206 may represent, for example, network interface controllers ("NICs") or other types of transceiver devices to send and receive communications over a network. Furthermore, the communication interface(s) 1206 may include one or more video cameras and/or audio devices 1222 to enable generation of video feeds and/or still images, and so forth.

In the illustrated example, computer-readable media 1204 includes a data store 1208. In some examples, the data store 1208 includes data storage such as a database, data warehouse, or other type of structured or unstructured data storage. In some examples, the data store 1208 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 1208 may store data for the operations of processes, applications, components, and/or modules stored in computer-readable media 1204 and/or executed by data processing unit(s) 1202 and/or accelerator(s). For instance, in some examples, the data store 1208 may store a meeting object 1210, a test session object 1212, and/or other data. The meeting object 1210 can include a total number of participants (e.g., users and/or client computing devices) in a communication session, activity that occurs in the communication session, a list of invitees to the communication session, and/or other data related to when and how the communication session is conducted or hosted. The test session object 1212 stores aspects of the rehearsal session, including identifiers of a subset of the attendees of the original meeting object, and other settings and options for controlling the rehearsal session.

The data store 1208 may also include contextual data 1214, which can include any information that defines the activity of a user, criteria, or thresholds disclosed herein.

Alternately, some or all of the above-referenced data can be stored on separate memories 1216 on board one or more data processing unit(s) 1202 such as a memory on board a CPU-type processor, a GPU-type processor, an FPGA-type accelerator, a DSP-type accelerator, and/or another accelerator. In this example, the computer-readable media 1204 also includes an operating system 1218 and application programming interface(s) 1210 (APIs) configured to expose the functionality and the data of the device 1200 to other devices. Additionally, the computer-readable media 1204 includes one or more modules such as the server module 1230, the output module 1232, and the GUI presentation module 1240, although the number of illustrated modules is just an example, and the number may vary higher or lower. That is, functionality described herein in association with the illustrated modules may be performed by a fewer number of modules or a larger number of modules on one device or spread across multiple devices.

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof. In addition, the words "that" or "if" can used interchangeably. Thus, a phrase such as "determining that criteria is satisfied" can be also interpreted as "determining if criteria is satisfied" and vice versa.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A method, executed by a computing system, for performing a test session for a subset of devices selected from a plurality of devices for a communication session for a plurality of users, comprising:
   generating a meeting object defining the communication session for the plurality of users, the meeting object defining a meeting start time and roles for identities of individual users of the plurality of users;
   selecting a subset of users from the plurality of users, wherein individual users of the subset of users are selected based on the individual users having predetermined roles assigned in the meeting object;
   generating a second meeting object for the test session, the second meeting object including a subset of identities selected from the identities of the communication session, wherein the selection of the subset of identities is based on the subset of identities having predetermined roles, the second meeting object defining a test session start time that is prior to the meeting start time;
   selecting the subset of devices based on an association between the subset of devices and the subset of identities having the predetermined roles;
   invoking the test session for measuring one or more performance parameters during the test session, wherein the one or more performance parameters include at least one of a network bandwidth parameter, an audio parameter, or a video parameter, where the measurement of the one or more performance parameters are applied to the subset of devices associated with the subset of identities selected based on having the predetermined roles assigned in the meeting object, wherein the measurement of the one or more performance parameters is performed during the test session prior to the meeting start time;
   determining that the one or more performance parameters do not meet one or more threshold requirements;
   in response to determining that the one or more performance parameters do not meet the one or more threshold requirements, generating data defining an adjustment to one or more settings that control the performance parameters; and
   invoking the communication session for the plurality of devices, wherein one or more devices of the plurality of devices use the adjustment to the one or more settings that control the performance parameters.

2. The method of claim 1, further comprising: causing a display of the one or more performance parameters that are measured during the test session, wherein the display includes a graphical indicator of a least one of the network bandwidth parameter, the audio parameter, or the video parameter.

3. The method of claim 1, further comprising: storing the adjustment to the one or more settings to the second meeting object defining the test session.

4. The method of claim 1, further comprising: causing the adjustment to one or more settings of the communication session based on the adjustment to the one or more settings during the test session.

5. The method of claim 1, further comprising:
   analyzing organizational data to determine a location of users having a second predetermined role;
   activating remote computing devices in geographic regions based on the location of the users having the second predetermined role, wherein the remote computing devices simulate activity of meeting attendees from the geographic regions for measuring the one or more performance parameters over a network connecting the system and the remote computing devices; and
   receiving live telemetry data from the remote computing devices based on the one or more performance parameters measured at the remote computing devices located in the geographic regions, wherein determining that the one or more performance parameters do not meet one or more threshold requirements includes use of the live telemetry data from the remote computing devices.

6. The method of claim 1, wherein the test session includes a first preliminary phase for measuring the one or more performance parameters for a first set of users having a first role, a second preliminary phase for measuring the one or more performance parameters for a second set of users having a second role, and a live session for measuring the one or more performance parameters for the second set of users having a second role and remote computing devices configured to simulate activity of other invitees to the communication session.

7. The method of claim 1, further comprising:
   receiving communication data from a remote computing device simulating activity of a meeting attendee; and
   causing a display of a video stream depicting at least one user of the subset of users on a device associated with the at least one user, wherein a format of a user interface including a rendering of the video stream depicting at least one user is based on settings of a user having an audience role.

8. The method of claim 1, further comprising:
   receiving communication data from a remote computing device simulating activity of a meeting attendee; and
   causing a display of a visual element indicating the activity of the meeting attendee, wherein a position and a format of the visual element simulates a user interface format to be displayed in response to live activity of a user having an audience role during the communication session.

9. A computing device for performing a test session for a subset of devices selected from a plurality of devices for a communication session for a plurality of users, the computing device comprising:
   one or more processing units; and
   a computer-readable storage medium having encoded thereon computer-executable instructions to cause the one or more processing units to:
   generate a meeting object defining the communication session for the plurality of users, the meeting object defining a meeting start time and roles for identities of individual users of the plurality of users;
   select a subset of users from the plurality of users, wherein individual users of the subset of users are selected based on the individual users having predetermined roles assigned in the meeting object;
   generate a second meeting object for the test session, the second meeting object including a subset of identities selected from the identities of the communication session, wherein the selection of the subset of identities is based on the subset of identities having predetermined roles, the second meeting object defining a test session start time that is prior to the meeting start time;

select the subset of devices based on an association between the subset of devices and the subset of identities having the predetermined roles;

invoke the test session for measuring one or more performance parameters during the test session, wherein the one or more performance parameters include at least one of a network bandwidth parameter, an audio parameter, or a video parameter, where the measurement of the one or more performance parameters are applied to the subset of devices associated with the subset of identities selected based on having the predetermined roles assigned in the meeting object, wherein the measurement of the one or more performance parameters is performed during the test session prior to the meeting start time;

determine that the one or more performance parameters do not meet one or more threshold requirements;

in response to determining that the one or more performance parameters do not meet the one or more threshold requirements, generate data defining an adjustment to one or more settings that control the performance parameters; and invoking the communication session for the plurality of devices, wherein one or more devices of the plurality of devices use the adjustment to the one or more settings that control the performance parameters.

10. The system of claim 9, wherein the instructions further cause the one or more data processing units to: cause a display of the one or more performance parameters that are measured during the test session, wherein the display includes a graphical indicator of a least one of the network bandwidth parameter, the audio parameter, or the video parameter.

11. The system of claim 9, wherein the instructions further cause the one or more data processing units to: store the adjustment to the one or more settings to the test session object defining the test session.

12. The system of claim 9, wherein the instructions further cause the one or more data processing units to: cause an adjustment to one or more settings of the communication session based on the adjustment to the one or more settings during the test session.

13. The system of claim 9, wherein the instructions further cause the one or more data processing units to:

analyze organizational data to determine a location of users having a second predetermined role;

activate remote computing devices in geographic regions based on the location of the users having the second predetermined role, wherein the remote computing devices simulate activity of meeting attendees from the geographic regions for measuring the one or more performance parameters over a network connecting the system and the remote computing devices; and receive live telemetry data from the remote computing devices based on the one or more performance parameters measured at the remote computing devices located in the geographic regions, wherein determining that the one or more performance parameters do not meet one or more threshold requirements includes use of the live telemetry data from the remote computing devices.

14. The system of claim 9, wherein the test session includes a first preliminary phase for measuring the one or more performance parameters for a first set of users having a first role, a second preliminary phase for measuring the one or more performance parameters for a second set of users having a second role, and a live session for measuring the one or more performance parameters for the second set of users having a second role and remote computing devices configured to simulate activity of other invitees to the communication session.

15. The system of claim 9, wherein the instructions further cause the one or more data processing units to:

receive communication data from a remote computing device simulating activity of a meeting attendee; and cause a display of a video stream depicting at least one user of the subset of users on a device associated with the at least one user, wherein a format of a user interface including a rendering of the video stream depicting at least one user is based on settings of a user having an audience role.

16. A computer-readable storage medium having encoded thereon computer-executable instructions for performing a test session for a subset of devices selected from a plurality of devices for a communication session for a plurality of users, the computer-executable instructions to cause the one or more processing units of a computing device to:

generate a meeting object defining the communication session for the plurality of users, the meeting object defining a meeting start time and roles for identities of individual users of the plurality of users;

select a subset of users from the plurality of users, wherein individual users of the subset of users are selected based on the individual users having predetermined roles assigned in the meeting object;

generate a second meeting object for the test session, the second meeting object including a subset of identities selected from the identities of the communication session, wherein the selection of the subset of identities is based on the subset of identities having predetermined roles, the second meeting object defining a test session start time that is prior to the meeting start time;

select the subset of devices based on an association between the subset of devices and the subset of identities having the predetermined roles;

invoke the test session for measuring one or more performance parameters during the test session, wherein the one or more performance parameters include at least one of a network bandwidth parameter, an audio parameter, or a video parameter, where the measurement of the one or more performance parameters are applied to the subset of devices associated with the subset of identities selected based on having the predetermined roles assigned in the meeting object, wherein the measurement of the one or more performance parameters is performed during the test session prior to the meeting start time;

determine that the one or more performance parameters do not meet one or more threshold requirements;

in response to determining that the one or more performance parameters do not meet the one or more threshold requirements, generate data defining an adjustment to one or more settings that control the performance parameters; and invoking the communication session for the plurality of devices, wherein one or more devices of the plurality of devices use the adjustment to the one or more settings that control the performance parameters.

17. The computer-readable storage medium of claim 16, wherein the instructions further cause the one or more data processing units to: cause a display of the one or more performance parameters that are measured during the test session, wherein the display includes a graphical indicator of a least one of the network bandwidth parameter, the audio parameter, or the video parameter.

18. The computer-readable storage medium of claim 16, wherein the instructions further cause the one or more data processing units to: cause an adjustment to one or more settings of the communication session based on the adjustment to the one or more settings during the test session.

19. The computer-readable storage medium of claim 16, wherein the instructions further cause the one or more data processing units to:
- analyze organizational data to determine a location of users having a second predetermined role;
- activate remote computing devices in geographic regions based on the location of the users having the second predetermined role, wherein the remote computing devices simulate activity of meeting attendees from the geographic regions for measuring the one or more performance parameters over a network connecting the system and the remote computing devices; and
- receive live telemetry data from the remote computing devices based on the one or more performance parameters measured at the remote computing devices located in the geographic regions, wherein determining that the one or more performance parameters do not meet one or more threshold requirements includes use of the live telemetry data from the remote computing devices.

\* \* \* \* \*